United States Patent
Ditges et al.

(10) Patent No.: US 9,228,693 B2
(45) Date of Patent: Jan. 5, 2016

(54) EQUIPMENT MOUNTING STRUCTURE

(76) Inventors: Jeff Ditges, Broomfield, CO (US);
Laura Ditges, Broomfield, CO (US)

(*) Notice: Subject to any disclaimer, the term of this patent is extended or adjusted under 35 U.S.C. 154(b) by 312 days.

(21) Appl. No.: 13/346,410

(22) Filed: Jan. 9, 2012

(65) Prior Publication Data
US 2012/0175321 A1    Jul. 12, 2012

Related U.S. Application Data

(60) Provisional application No. 61/430,880, filed on Jan. 7, 2011.

(51) Int. Cl.
*A47F 7/00* (2006.01)
*F16M 11/10* (2006.01)
*F16M 11/24* (2006.01)

(52) U.S. Cl.
CPC ............. *F16M 11/10* (2013.01); *F16M 11/24* (2013.01)

(58) Field of Classification Search
CPC ................................ F16M 11/10; F16M 11/24
USPC .......... 211/26, 26.2, 187, 153, 189, 190, 207;
248/121, 122.1, 123.11, 123.2, 124.1, 248/125.1, 125.2, 917–919
See application file for complete search history.

(56) References Cited

U.S. PATENT DOCUMENTS

| | | | |
|---|---|---|---|
| 2,940,718 A * | 6/1960 | Beal | 248/245 |
| 3,848,844 A * | 11/1974 | Barrett | 248/245 |
| 4,109,429 A * | 8/1978 | Whisson | 52/126.4 |
| 4,516,751 A * | 5/1985 | Westbrook | 248/279.1 |
| 4,638,969 A | 1/1987 | Brown | |
| D288,157 S | 2/1987 | Sandor | |
| 5,611,513 A | 3/1997 | Rosen | |
| 5,630,566 A | 5/1997 | Case | |
| 5,868,079 A | 2/1999 | Charny | |
| 5,918,841 A | 7/1999 | Sweere et al. | |
| 6,012,591 A | 1/2000 | Brandenberg | |
| 6,286,794 B1 * | 9/2001 | Harbin | 248/123.2 |
| 6,293,506 B1 | 9/2001 | Gutgsell et al. | |
| 6,374,752 B1 | 4/2002 | Walser | |
| 6,422,407 B2 * | 7/2002 | Arai | 211/189 |
| 6,478,274 B1 | 11/2002 | Oddsen, Jr. et al. | |
| 6,547,088 B1 * | 4/2003 | Wang | 211/187 |
| 6,591,996 B1 * | 7/2003 | Wu | 211/90.02 |
| 6,712,008 B1 | 3/2004 | Habenicht et al. | |
| 6,783,105 B2 | 8/2004 | Oddsen, Jr. et al. | |
| 6,928,948 B1 * | 8/2005 | Shannon | 114/343 |
| 6,938,869 B2 | 9/2005 | Lin et al. | |
| 7,063,296 B2 | 6/2006 | Williams | |
| 7,152,488 B2 | 12/2006 | Hedrich et al. | |
| 7,195,213 B2 * | 3/2007 | Weatherly | 248/125.1 |
| 7,246,780 B2 | 7/2007 | Oddsen, Jr. et al. | |
| 2002/0027117 A1 | 3/2002 | Brandenberg | |
| 2004/0244512 A1 | 12/2004 | Hedrich et al. | |
| 2006/0022096 A1 | 2/2006 | Chan et al. | |
| 2008/0265107 A1 | 10/2008 | Saez | |
| 2010/0213151 A1 | 8/2010 | Theesfeld et al. | |

* cited by examiner

*Primary Examiner* — Korie H Chan
(74) *Attorney, Agent, or Firm* — Lathrop & Gage LLP

(57) ABSTRACT

A modular pole system is used to support office systems or equipment to facilitate point of sale retail functions. An elongate pole has a plurality of channels that receive locking nuts to support the equipment in place. Electronic equipment including such items as scanners, printers, displays, and telephones may be placed on specialized equipment mounting structures proximate the pole or with use of extension arms to space the equipment away from the pole.

5 Claims, 27 Drawing Sheets

EQUIPMENT MOUNTING STRUCTURE

RELATED APPLICATIONS

This application claims the benefit of priority of U.S. Application Ser. No. 61/430,880 filed Jan. 7, 2011, which is incorporated herein by reference in its entirety.

BACKGROUND

Electronic devices have become indispensable to the modern workplace. These devices typically have defined functions, such as a display, a printer, and a keyboard. It is problematic that deployment of this equipment occupies surface area, which may not be available at a particular workstation. Accordingly, the art has developed various systems to densify the deployment of these devices over a particular surface area. Unfortunately, this densification may inconveniently position the devices, and the systems may lack flexibility if an equipment upgrade or change is required.

U.S. Pat. No. 7,063,296 shows a swinging brace that is adapted to carry an electronic device. The brace has three pivots for a full range of motion abutting a rail mount. United States Patent publications 2010/0213151 and 2008/026510 show similar rail mounting systems. U.S. Pat. No. 6,783,105 shows a display arm that is extensibly received in a channel to facilitate a vertical height adjustment. An electronic workstation pivots forward.

SUMMARY

The presently disclosed instrumentalities overcome the problems discussed above and advance the art by providing an equipment mounting structure in a modular form that that is quickly installed, easily alterable as to content, and selectively adjustable.

The equipment mounting structure includes a vertically elongate pole having at least one channel formed therein. The channel has a bight connecting a pair of opposed wings to define an inward space. Each wing has a ridge extending inwardly over the inward space towards the other wing. A mount, such as an L-bracket may be used to attach the elongate pole to a support structure, such as a ceiling or a countertop. A clamp assembly is used to mount an equipment carrier to the elongate pole. The clamp assembly does this by engaging the channel with clamping action as a selected height on the elongate pole.

In one embodiment, the clamp assembly may include a block presenting a through aperture, a bolt passing through the aperture, and a channel nut threaded onto the bolt to provide the binding interaction with the channel.

In one embodiment, the equipment carrier may be coupled with the clamp assembly through a pivot. This may be, for example, a pivotally adjustable keyboard mount that pivots in a vertical arc. Alternatively, this may be a pivotally adjustable display mount that pivots in one or both of a horizontal and a vertical arc.

Some embodiments may include a hollow extension arm that is used to position electronic devices laterally to the side of the elongate pole. Cables may be routed through the hollow interior of the extension arm.

In some embodiments, the elongate pole may have a square cross-section perpendicular to the at least one channel. A pair of channels may be formed in the wall of the elongate pole. The clamp assembly may engage both of these channels at once to enhance lateral stability of the equipment carrier.

DETAILED DESCRIPTION

Figure 1:
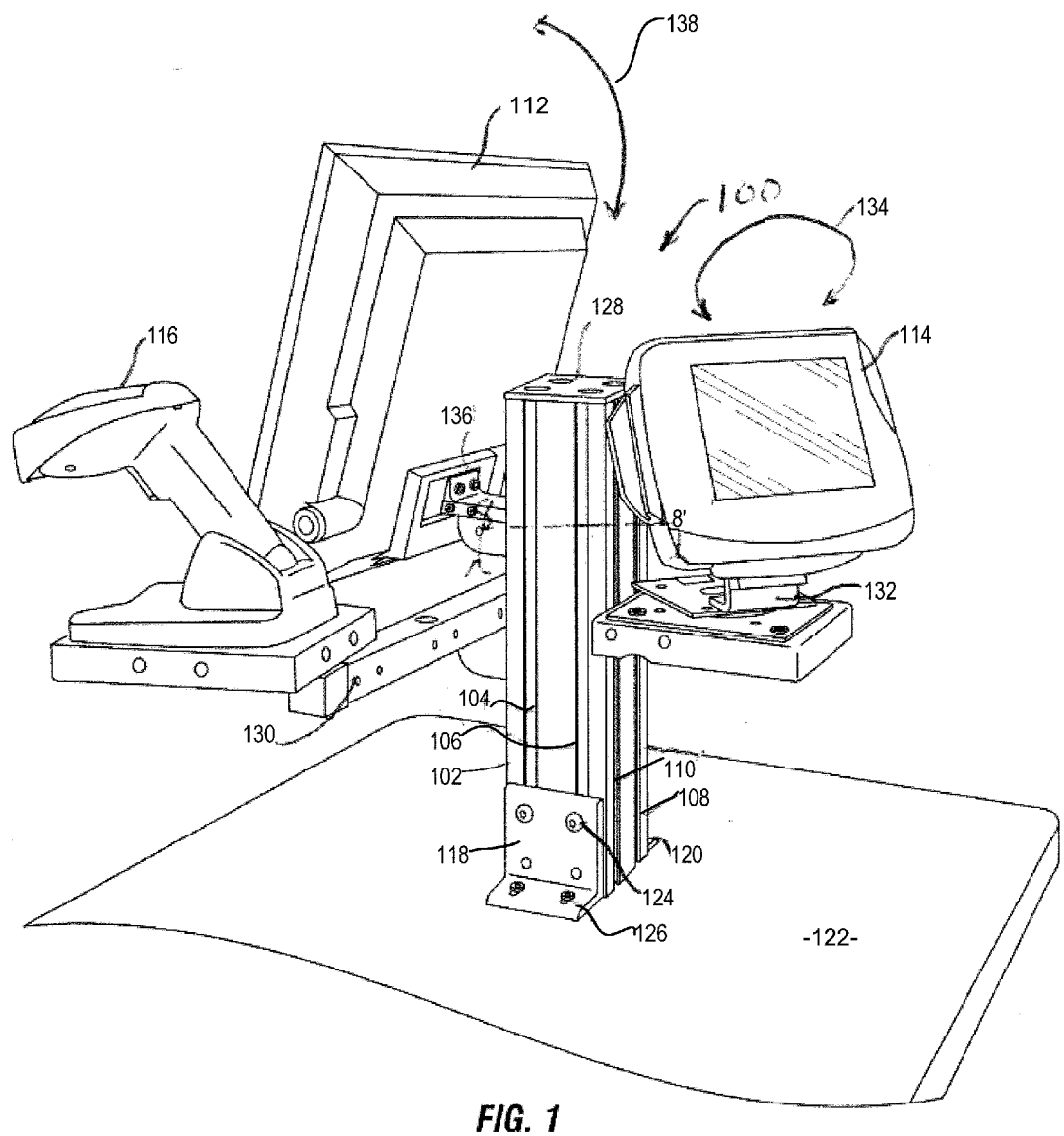
FIG. 1 is a right rear side perspective view of an equipment mounting structure according to a first embodiment supporting a plurality of electronic devices on a vertically elongate pole.

FIG. 1 shows one embodiment of the equipment mounting structure 100. A vertically elongate hollow pole 102 has a plurality of channels 104, 106, 108, 110 formed therein. Various clamp assemblies (not shown) connect these channels with mounts bearing electronic equipment, such as displays 112, 114 and scanner 116. L-brackets 118, 120 mount the pole 102 to countertop 122 by operation of threaded fasteners 124, 126. Cables for the electronic equipment may be routed through countertop 122 into the hollow interior of pole 102, which is sealed by cap 128. The cabling may be any cabling that is needed for operation of such electronic equipment as keyboards 112, 114, display 116, printer 118, and scanner 122. A hollow extension arm 130 optionally routs cabling to scanner 116 and may be used to extend sideways the operating position of scanner 116. Pivots may be provided, such as a pivoting base 132 for display 114 facilitating selective adjustment of display 114 along horizontal arc 134, and a pivot mechanism 136 facilitating selective adjustment of display 112 along vertical arc 138.

Figure 2:
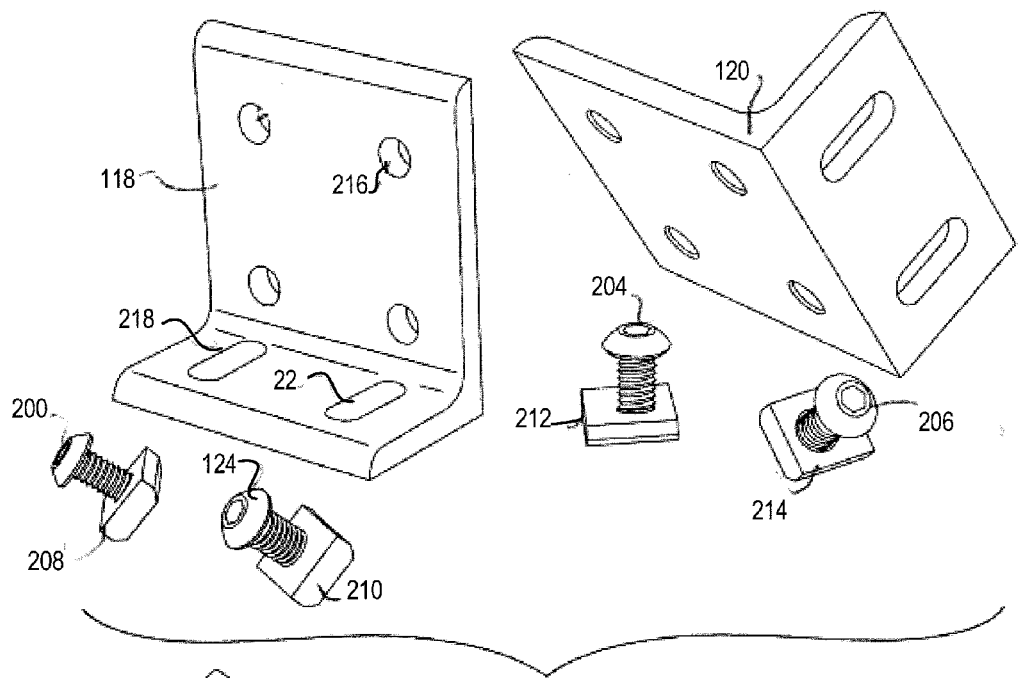
FIG. 2 shows L-brackets used to support a vertically elongate pole shown in FIG. 1.

FIG. 2 provides additional detail with respect to the L-brackets 118, 120. Threaded fasteners 200, 124, 204, 206, 208 are each provided with flat nuts or channel nuts 208, 210, 212, 214. By way of example, threaded fastener 200 may be placed through aperture 216 and threaded onto flat nut 208, which is placed in channel 106 (see FIG. 1). Tightening of threaded fastener 124 locks L-bracket 118 into position against pole 102. Threaded fasteners received in apertures 218, 220 may be screw or bolts locking L-bracket 118 into position against countertop 122 (See FIG. 1).

Figure 3:
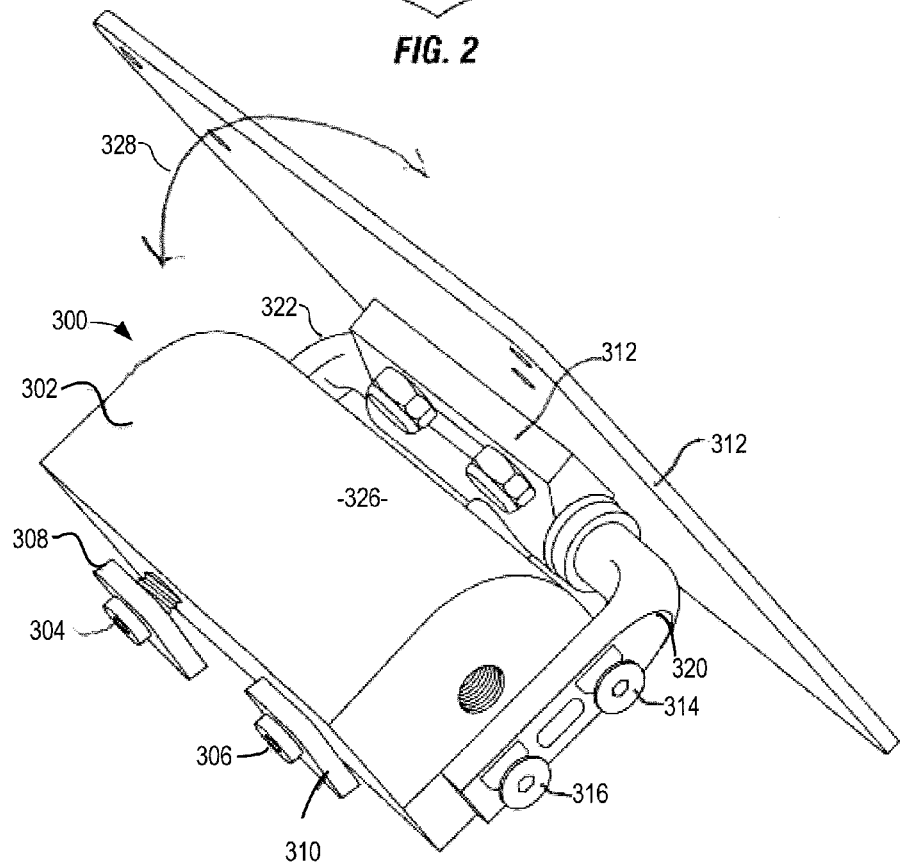
FIG. 3 is a left, top side perspective view of a clamp assembly and an equipment carrier made ready for deployment on the vertically elongate pole of FIG. 1.

FIG. 3 shows a clamp assembly 300 that couples the electronic equipment mounts with pole 102, as shown in FIG. 1. The clamp assembly 300 includes an optional mounting block 302 that may be, for example, cast or machined from a block of metal. Bolts 304, 306 extend through block 302 into flat nuts or channel nuts 308, 310. In one embodiment, nut 308 may be received in channel 108 (see FIG. 1) and nut 310 may be received in the parallel track of channel 110. Tightening of bolts 304, 306 against nuts 308, 310 in channels 108, 110 provides lateral stability against tipping of electronic devices mounted on pad 312. The mounting block 302 may be provided with apertures for receipt of bolts 314, 316 that couple pivot assembly to mounting block 302. The pivot assembly has a pair of legs 320, 322 culminating at pivot 324, which is bolted to plate 312. An arced shoulder 326 facilitates pivoting motion of plate 312 along arc 328. The pivot assembly 318 may, for example, be used to support display 112 as shown in FIG. 1.

Figure 4:
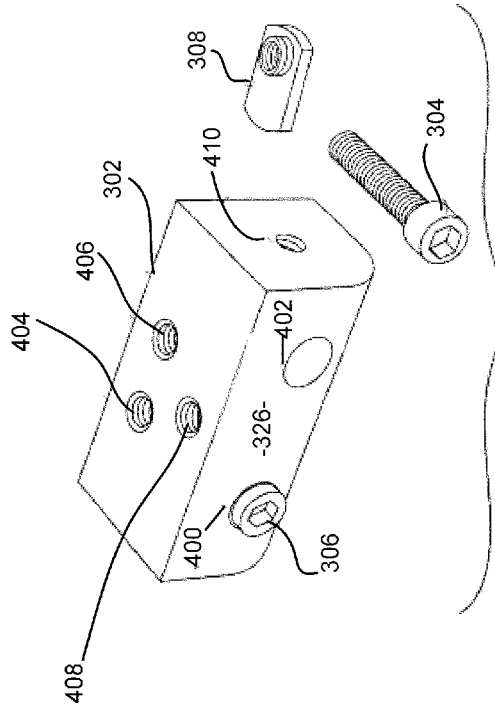
FIG. 4 provides additional detail with respect to the clamp assembly of FIG. 3.

FIG. 4 provides additional detail with respect to the mounting block 302. The bolts 306, 304 are shown as allen screws, as may be received in apertures 400, 410. The mounting block 302 may be provided with any number of internally threaded apertures 404, 406, 408, 410, as may complement equipment mounting assemblies, which are shown by way of example as pivot assembly 318 (see FIG. 3).

Figure 5:
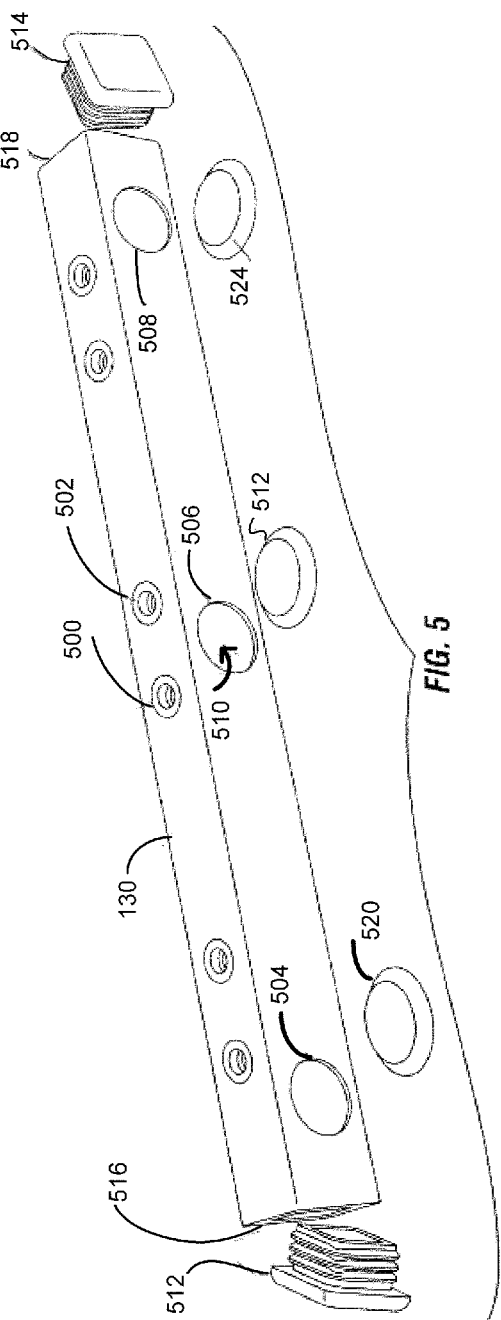
FIG. 5 shows a hollow extension arm that may be used to support electronic devices to the side of the vertically elongate pole, and rout cables to the electronic devices.

FIG. 5 provides additional detail with respect to the hollow extension arm 130 (see also FIG. 1) that is used for cable management. The extension arm 130 contains holes 500, 502 that may receive bolts with flat nuts, such as bolt 304 and flat nut 308 shown in FIG. 4. These may be received in parallel tracks on a face of pole 102. Cables (not shown in FIG. 5) may pass through any of openings 504, 506, 508 into the hollow interior 510 of extension arm 130. End caps 512, 514 seal the open ends 516, 518 of extension arm 130. Caps 520, 522, 524 seal corresponding openings 504, 506, 508 when cables do no pass through these openings.

Figure 6:
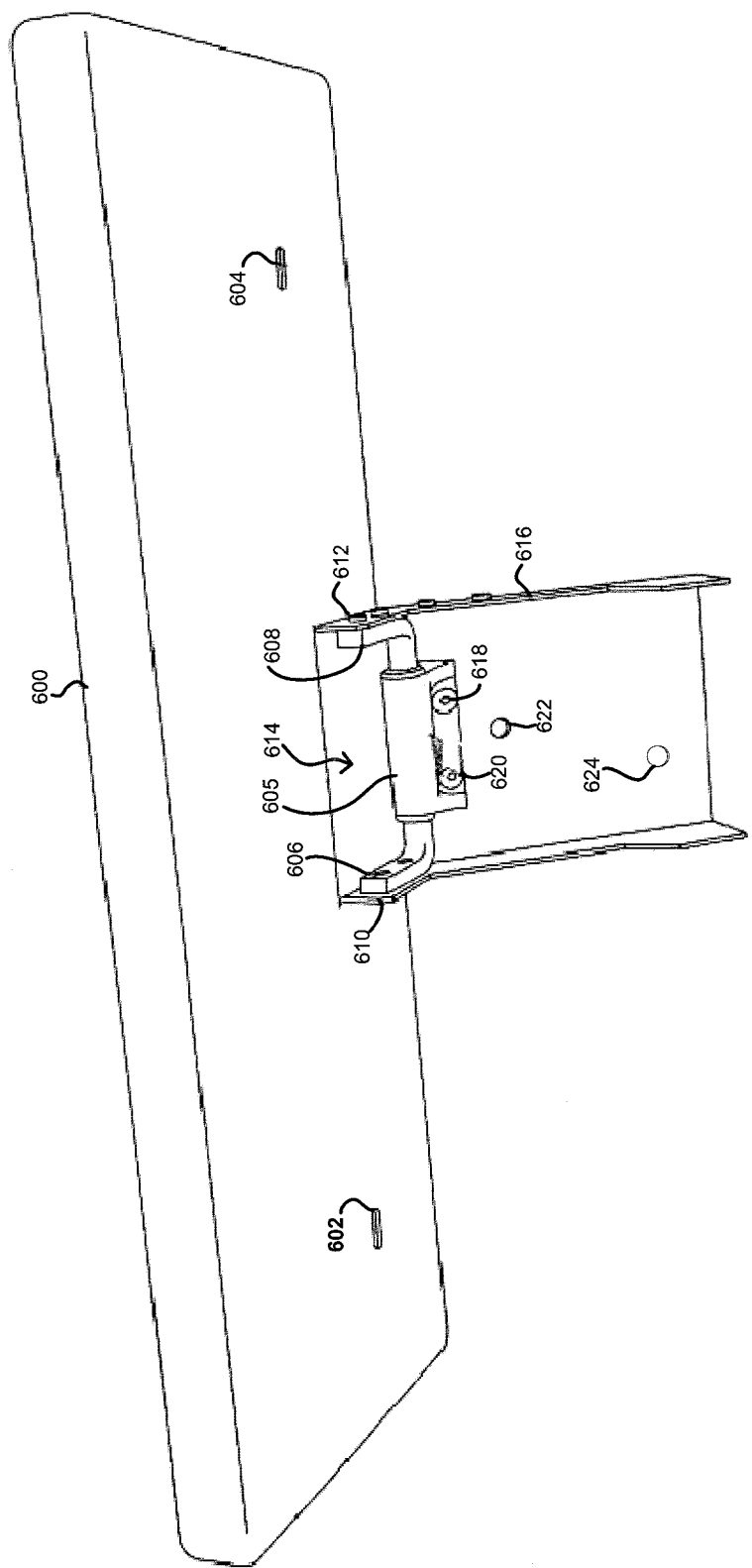
FIG. 6 is a bottom front perspective view of a pivoting equipment carrier for retaining a keyboard.

FIG. 6 provides additional detail with respect to a keyboard mount that may be used to mount keyboards 112, 114 (see FIG. 1). A tray 600 is used to support a keyboard (not shown), which may be secured by threaded fasteners, clips or rivets (not shown) passing through apertures 602, 604. A pivot 605 attaches with legs 606, 608 to ears 610, 612 proximate opening 614. Arm 616 attaches to pivot 605 through bolts 618, 620. Apertures 622, 624 may be used for bolting arm 616 to clamp assembly 300 (see FIG. 3).

Figure 7:
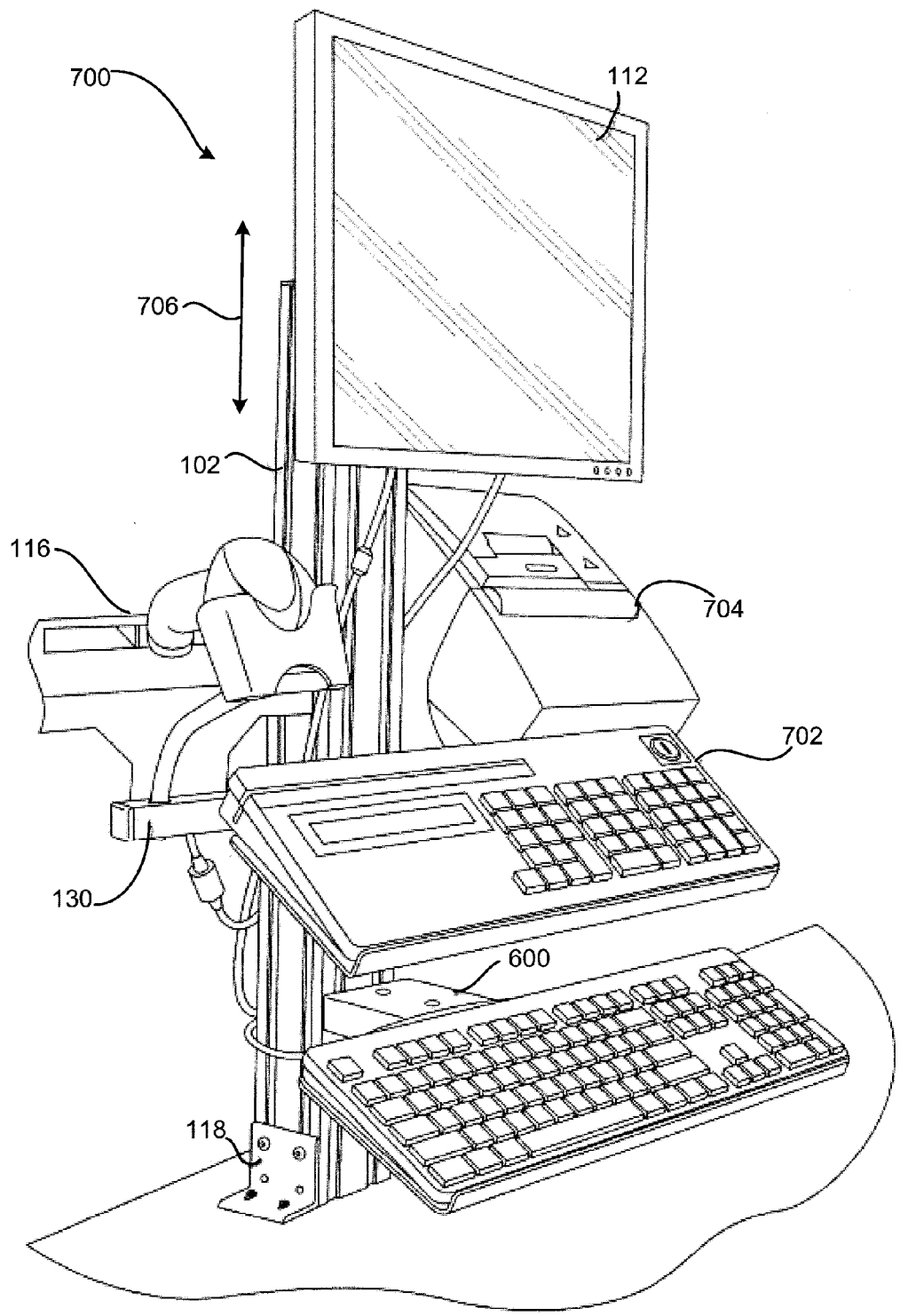
FIG. 7 is a front left perspective view of an equipment mounting structure according to a second embodiment supporting a plurality of electronic devices on a vertically elongate pole.

The instrumentalities disclosed above may be combined in any number of ways for selective positioning of electronic equipment. FIG. 7 shows an alternative embodiment as workstation 700. The workstation 700 includes a number of structures that are described above including, for example, pole 102, display 112, scanner 116, tray 600, L-bracket 118, and extension arm 130. Additionally provided items include a keypad terminal 702 and a printer 704. Items mounted by the clamp assemblies 300 (shot shown) may be clamped at selected positions on pole 102. The clamp assemblies may be loosened for repositioning at selected heights along path 706 and tightened to retain individual pieces of the electronic equipment at the new positions.

Figure 8:
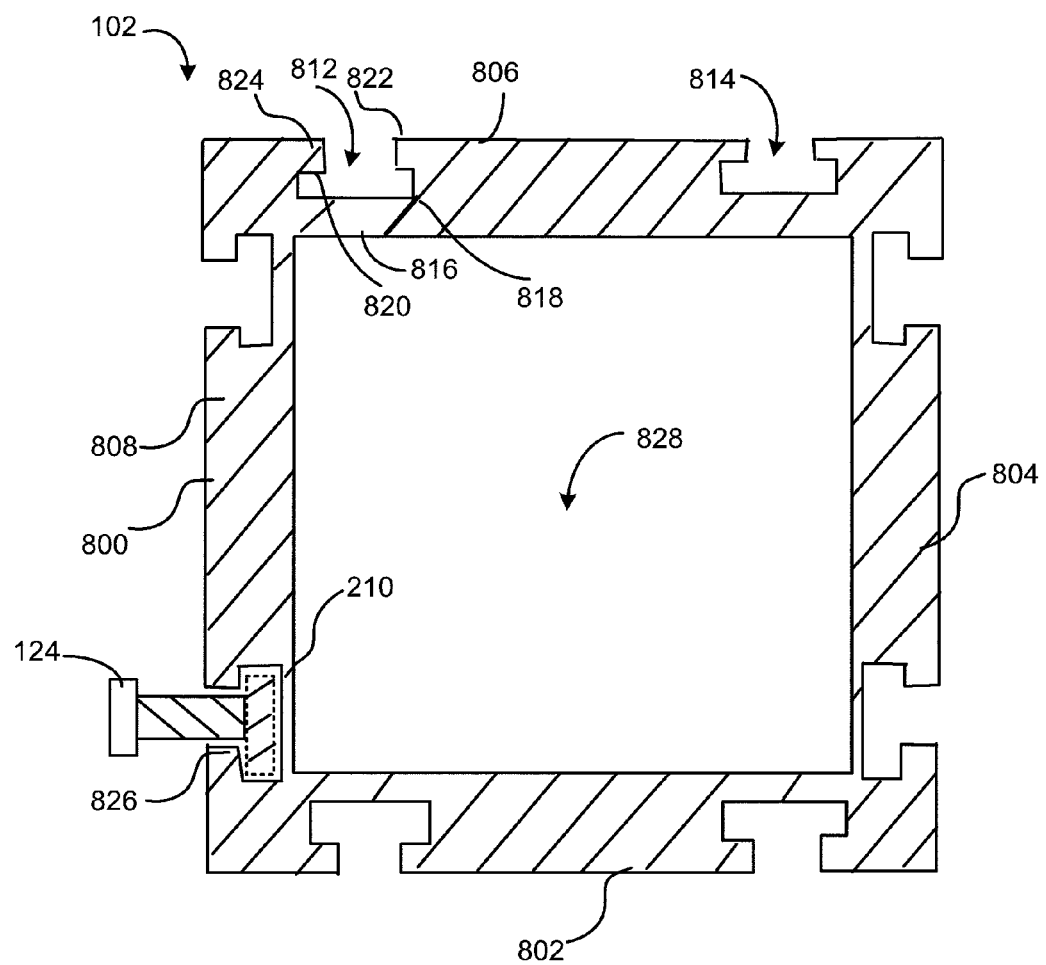
FIG. 8 is a cross-sectional view of the vertically elongate pole taken along line 8-8' of FIG. 1.

The pole 102 may be any height, and may be mounted by any means known to the art, such as by being anchored to a floor or ceiling, in addition to a countertop 122 as shown in FIG. 1. FIG. 8 shows a cross-section taken along line 8-8' of FIG. 1 to show interior detail with respect to pole 102. The pole 102 has a continuous wall 800 of generally square cross section presenting four faces 802, 804, 806, 808. Each face presents a pair of channels, for example, channels 812, 814. As illustrated in reference to channel 812, each channel has a bight 816 connecting wings 818, 820. Each wing has a corresponding protrusion 822, 824 extending inwardly towards one another over the inward space of channel 812. These protrusions receive the clamping force of flat nuts inserted in the respective channels, illustrated as flat nut 210 attached to threaded fastener 124 in channel 826. Hollow space 828 interior to wall 800 may be used to route cabling for operation of the electronic devices show above, and advantageously reduces the overall weight of pole 102.

Figure 9:
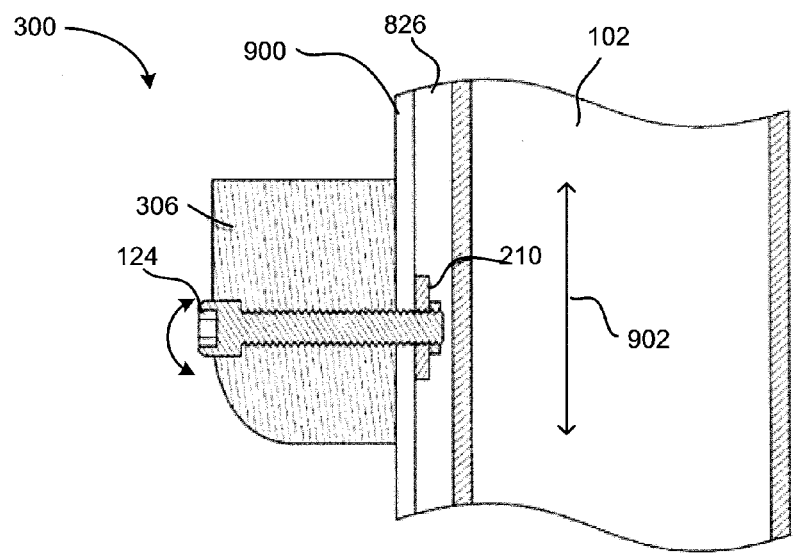
FIG. 9 is a midsectional view illustrating the operation of the clamp assembly shown in FIG. 4.

FIG. 9 is a midsectional view that provides additional detail with respect to the operation of clamp assembly 300. Rotation of threaded fastener 124 selectively tightens flat nut 210, which engages protrusion 900 of channel 826 to retain the clamp assembly in place. Counter rotation of threaded fastener 124 loosens flat nut 210 from this binding engagement, such that the clamp assembly 300 may be repositioned at a selected height along pathway 902. Tightening of threaded fastener 124 secures the clamp assembly at the new position.

Figure 10:
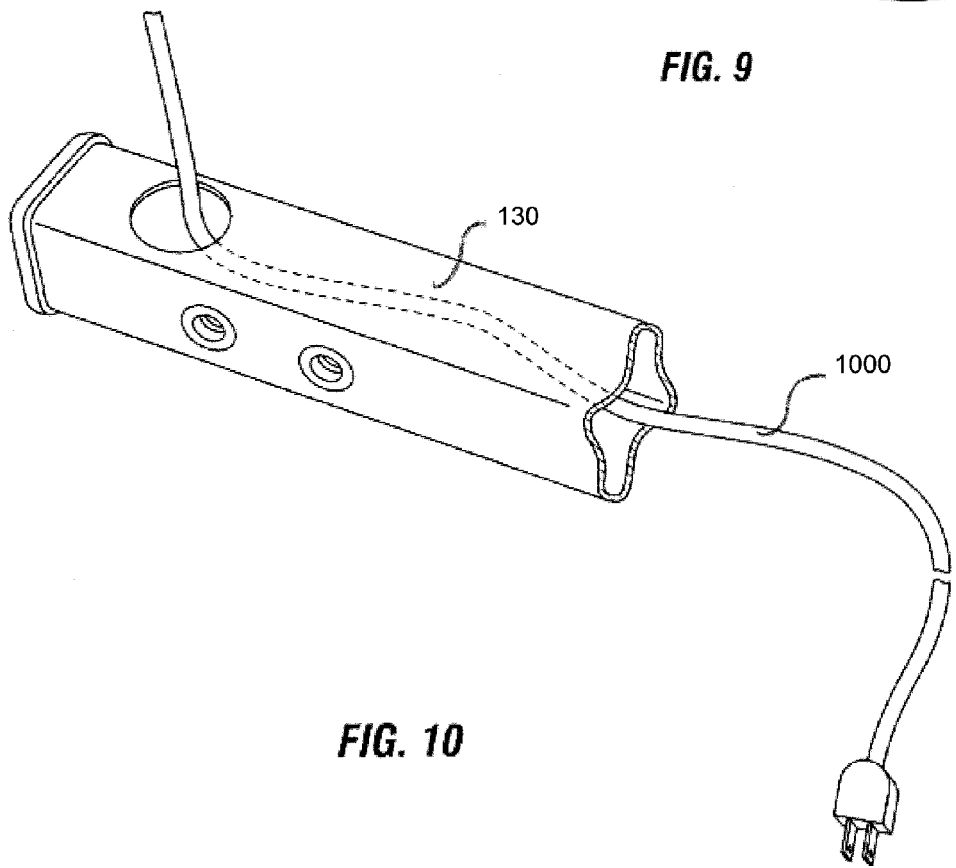
FIG. 10 shows cable routing through the hollow extension arm of FIG. 5.

FIG. 10 shows routing of power cable 1000 through the interior of extension arm 130.

Figure 11:
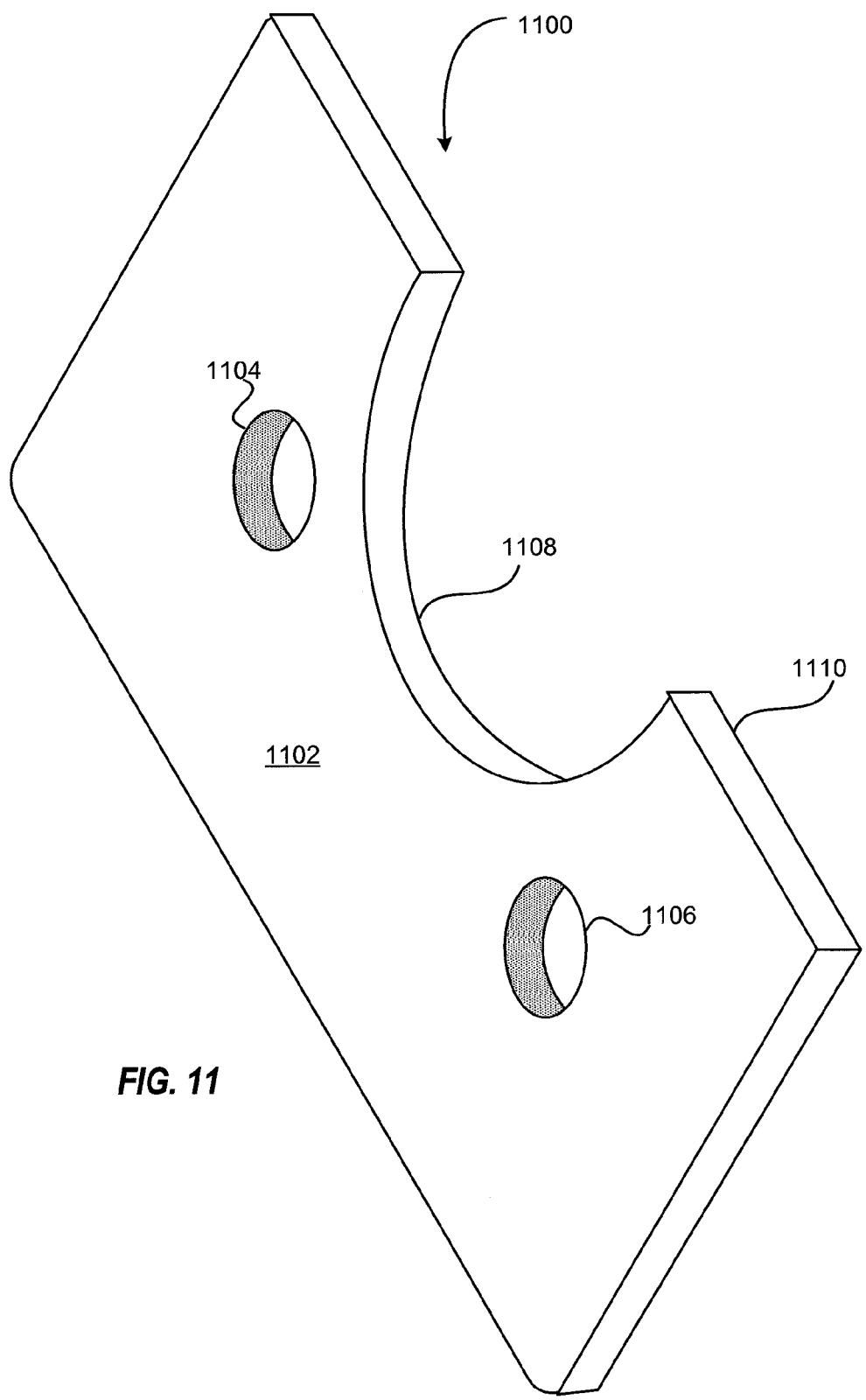
FIG. 11 shows half of a split end cap assembly for the vertically elongate pole, the other half of the assembly being a mirror image thereof.

FIG. 11 is a top perspective view that shows half of a split end cap assembly 1100 for the vertically elongate pole 102 (see FIG. 1), the other half of the assembly being a mirror image thereof to form a square. A generally rectangular plate 1102 has two apertures 1104, 1106 formed for the passage of wires therethrough, and a central arc 1108. A bottom side 1110 has raised registration bosses (not shown) to retain the cap assembly 1100 in contact with interior wall 830 (see FIG. 8) of the pole 102.

Figure 12:
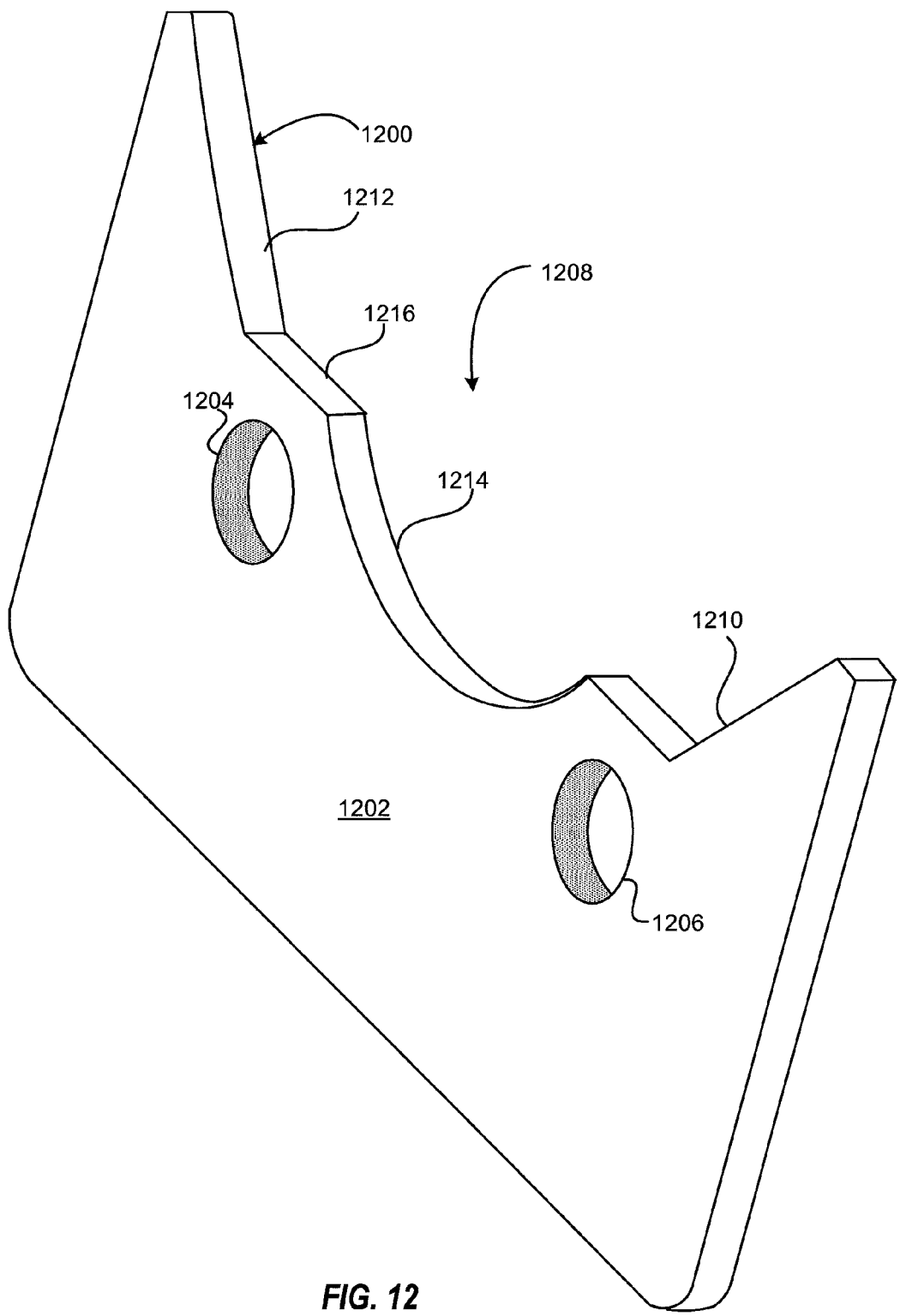
FIG. 12 shows part of a split cap assembly for the vertically elongate pole, the other half of the assembly being complementary thereto to form a square.

FIG. 12 is a top perspective view that shows part of a split cap assembly 1200 for the vertically elongate pole 102 (see FIG. 1), the other half of the assembly being a mirror image thereof thereto to form a square. A plate 1202 has two apertures 1204, 1206 formed therethrough and a central opening 1208 for the passage of wires. The central opening 1210 has beveled wings 1210, 1212 connected by a central arc 1214. A bottom side 1216 has raised registration bosses (not shown) to retain the cap assembly 1200 in contact with interior wall 830 (see FIG. 8) of the pole 102.

Figure 13:
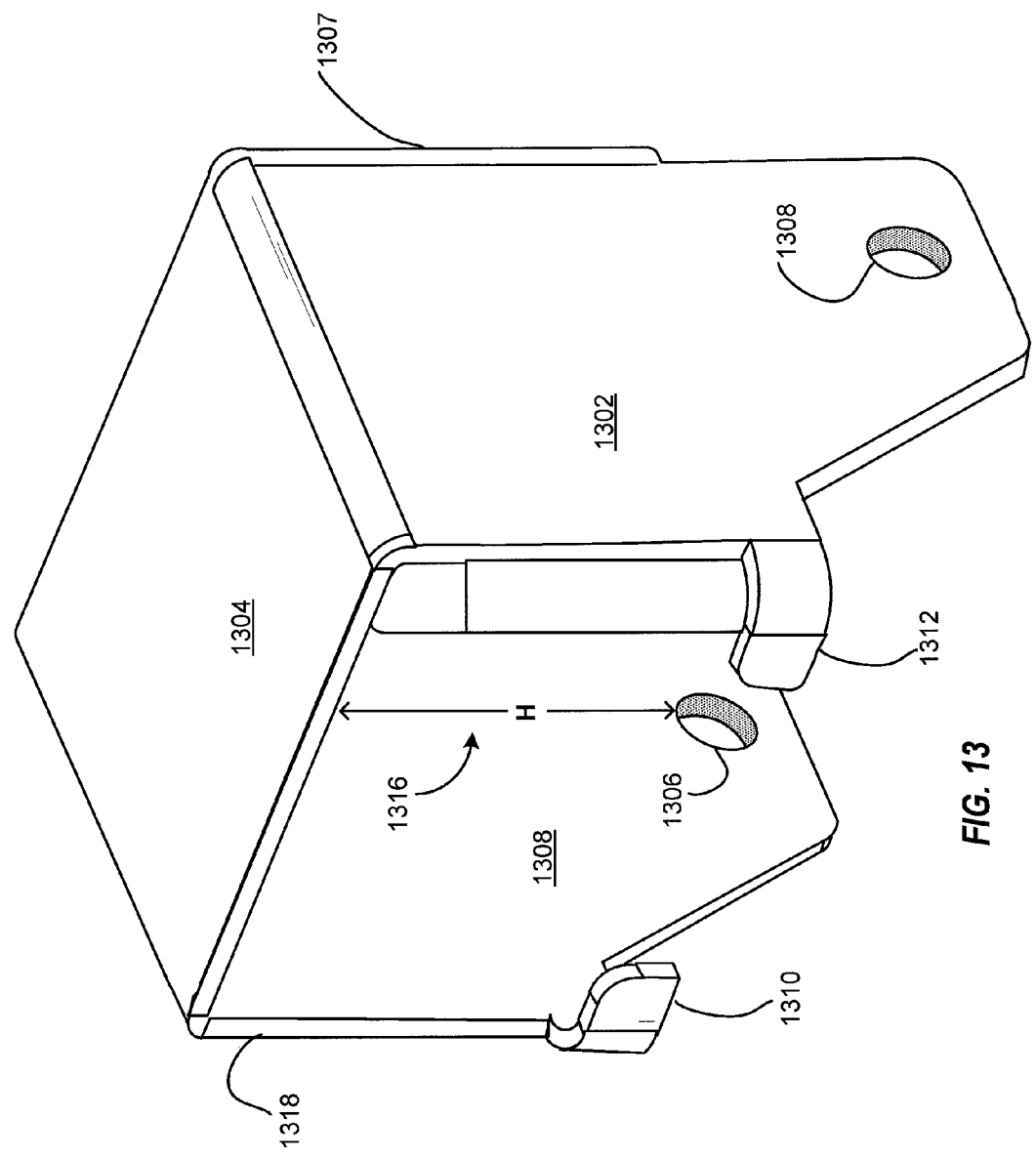
FIG. 13 shows an end cap for the vertically elongate pole, the end cap being selectively adjustable to route wires.

FIG. 13 is a top perspective view that shows an end cap 1300 for the vertically elongate poll 102 (see FIG. 1), the end cap 1300 being selectively adjustable to route wires. The cap 1300 includes three sidewalls 1302, 1304, 1307 and a top 1308. The sidewalls 1302, 1304 are provided with apertures and inwardly bent ears 1310, 1312. This structure forms an interior space 1316 that circumscribes an outer wall 832 of pole 102 (see FIG. 8). Fastener/nut assemblies 124, 210 may pass through apertures 1306, 1308 to retain the cap 1300 in place on pole 102 by locking in any of channels 826 such that a front opening 1318 is selectively adjustable over a height H.

Figure 14:
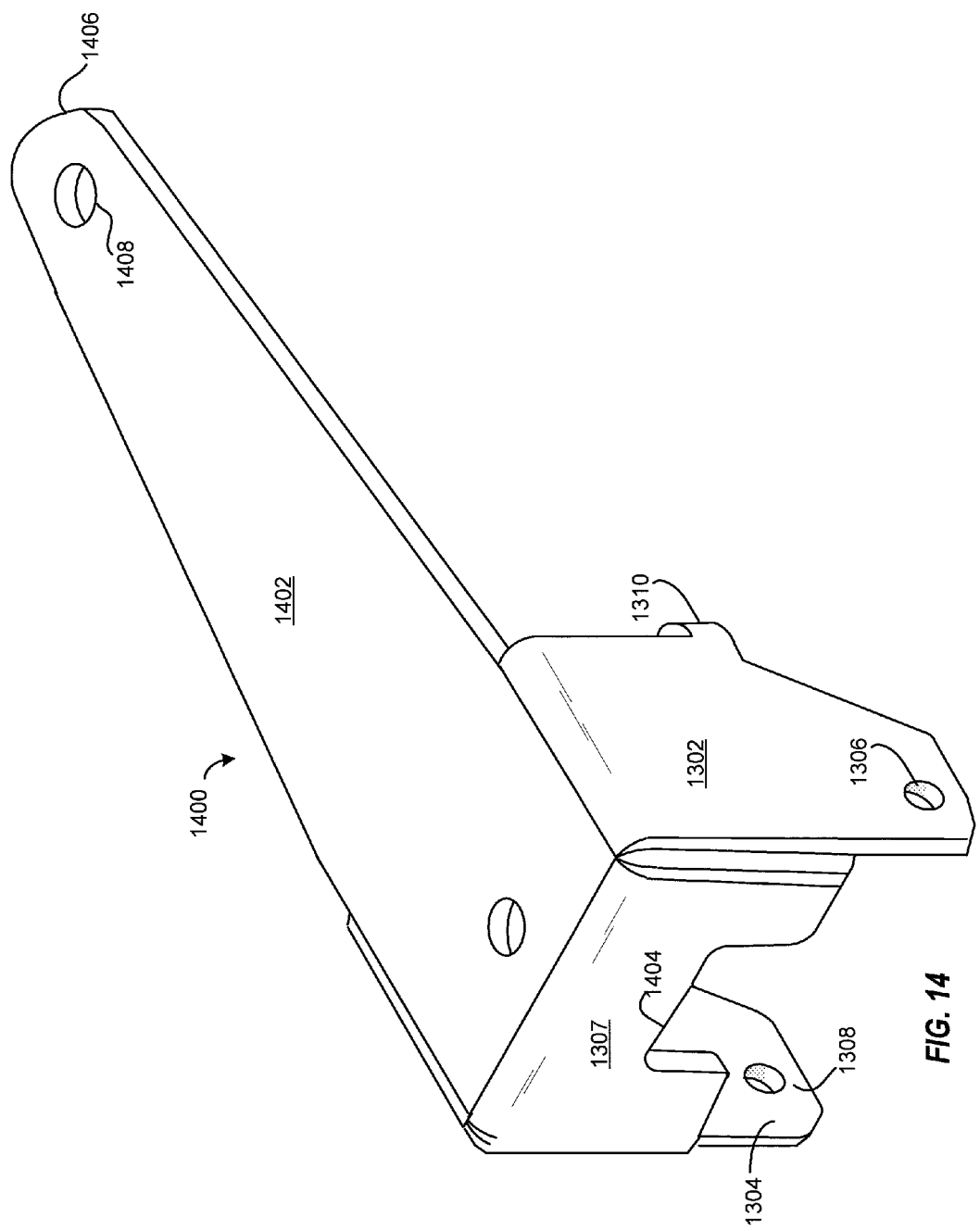
FIG. 14 shows an end cap with a duckbill extension that may be used to mount electronic equipment in a desired orientation.

FIG. 14 is a top rear perspective view that shows an end cap 1400 with a duckbill extension 1402 that may be used to mount electronic equipment in a desired orientation. FIG. 14 retains like numbering of identical elements with respect to the end cap 1300 of FIG. 13, where it will be further appreciated that the rear wall 1307 is formed with a channel opening 1404 to facilitate the routing of cables. The duckbill extension 1402 tapers forwardly to a rounded nose 1406 that is formed with an aperture 1408 therethrough. The aperture 1408 is built to receive an upright bolt (not shown) that attaches a monitor or other equipment and serves as a pivot. It will be appreciated that the duckbill extension may be provided in any length, such as short medium or long lengths.

Figure 15:
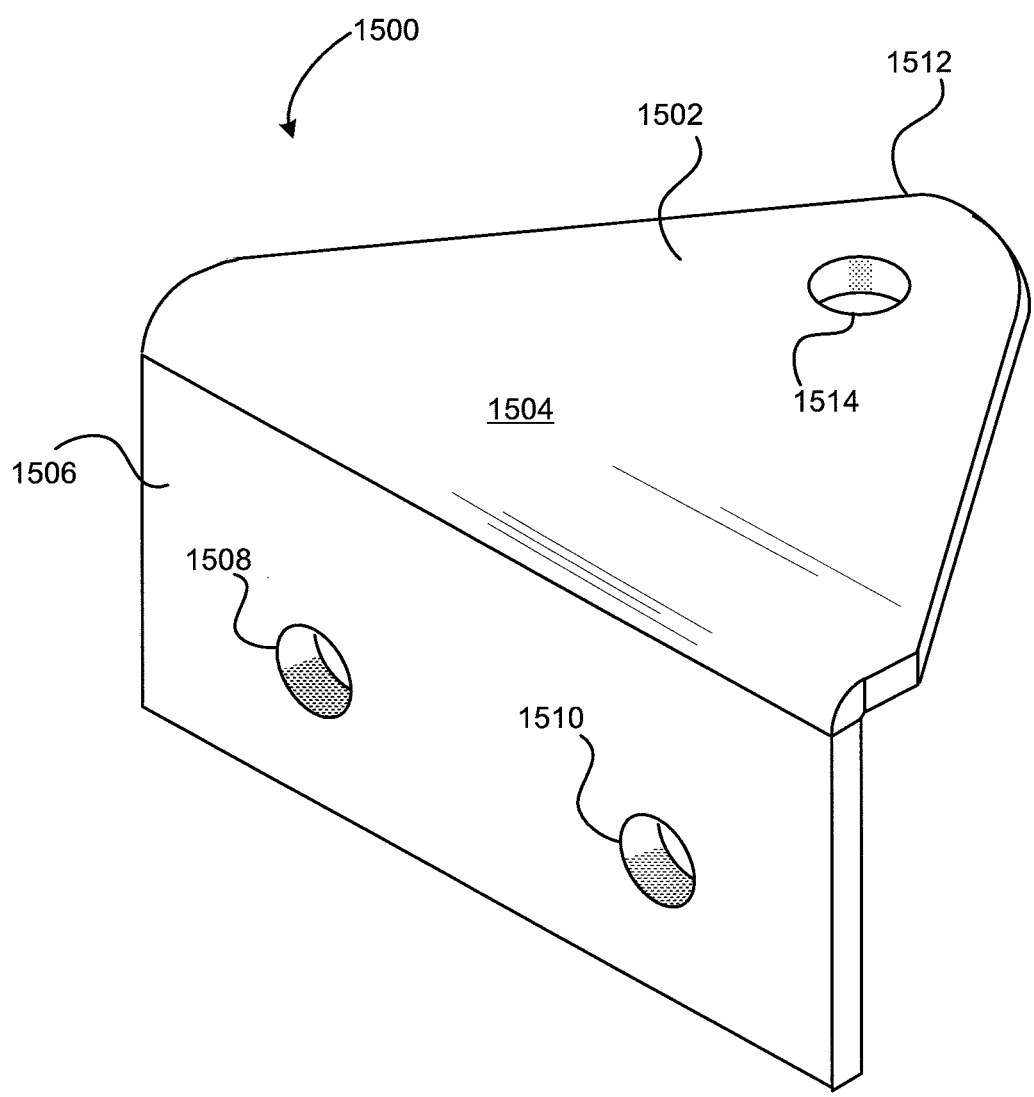
FIG. 15 shows a monitor mount with a short arm extension.

FIG. 15 is a top rear perspective view that shows a monitor mount 1500 with a short arm extension. The mount 1500 is made of a plate that is bent at a right angle to provide a rear section 1506 and the arm extension 1502. The rear section 1506 has apertures 1508, 1510 formed therethrough. These apertures are made to receive fastener/nut combinations 124, 210 to engage channels of the pole 102 as shown in FIG. 8 for attaching the mount 1500 to pole 102. The arm extension 1502 tapers forwardly to a rounded nose 1512 and that is formed with an aperture 1514 therethrough. The aperture 1514 is built to receive an upright bolt (not shown) that attaches a monitor or other equipment and serves as a pivot.

Figure 16:
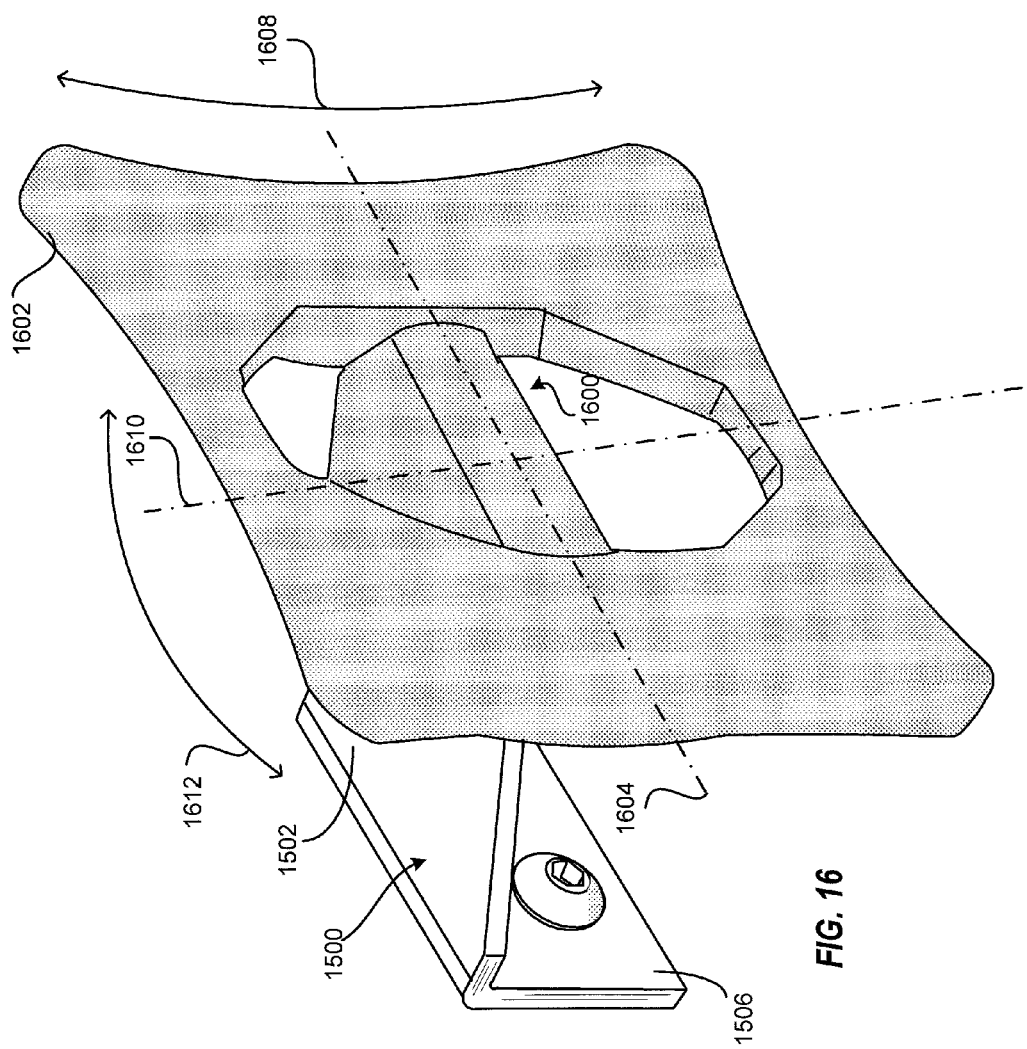
FIG. 16 shows a monitor mount equipped with tilt and swivel structure to vary the position of a VESA plate.

FIG. 16 is a top front perspective view of the monitor mount 1500 equipped with tilt and swivel structure 1600 to vary the position of a Video Electronics Standards Association (VESA) plate 1602. The VESA plate 1602 is retained ion a tilt arm with an internal bar (not shown) on axis 1604 permitting the VESA plate to tilt up or down as indicated by arrow 1608. The aperture 1514 and bolt described in context of FIG. 15 afford side-to-side pivoting on axis 1610 as indicated generally by directional arrow 1612.

Figure 17:
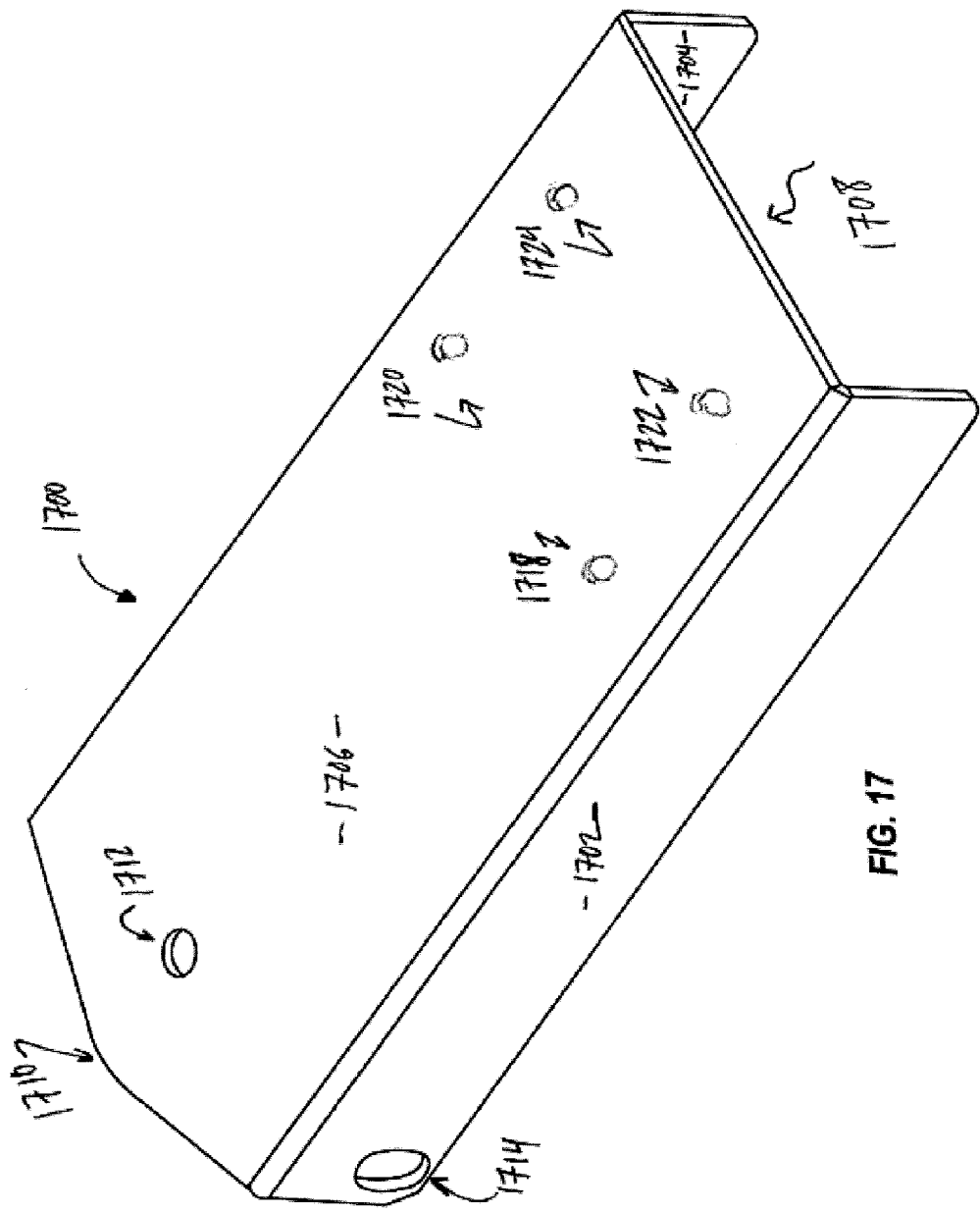
FIG. 17 shows an extension arm for horizontal mounting purposes.

FIG. 17 is a top front perspective view that shows an extension arm 1700 for horizontal mounting purposes to hollow extension arm 130 (see FIG. 1 and FIG. 5). The extension arm 1700 includes two sidewalls 1702, 1704 and a top 1706. A bight 1708 connects sidewalls 1702 and 1704 via top 1706. Top 1706 tapers rearward towards a rounded nose 1710 that is formed with an aperture 1712 therethrough. Aperture 1712 is useful for mounting extension arm 1700 to hollow extension arm 130 through holes 500 or 502 (see FIG. 5). Holes 500 or 502 may receive bolts with flat nuts, such as bolt 304 and flat nut 308 shown in FIG. 4. Extension arm 1700 may thereby be mounted to hollow extension arm 130 by passing bolt 304 through aperture 1712 and into hole 500 or 502 and into flat nut 308 which is within the hollow interior 510 of hollow extension arm 130. Sidewalls 1702 and 1704 are provided with aperture 1714 in sidewall 1702, and aperture 1716 (not shown) in sidewall 1704 which may be useful for routing cables. Extension arm 1700 is provided with apertures 1718, 1720, 1722 and 1724 in the forward part of top 1706 which are useful for mounting trays, mounts, mount pads, swivels, etc. through receiving screws or bolts, such as threaded fastener 200, that have passed through a mounting tray, mount, mount pad, swivel, etc. and are then threaded onto a nut such as flat nut 208 (see FIG. 2). Tightening of the screw or bolt engaged with a flat nut secures extension arm 1700 to the mounting tray, mount, mount pad, swivel, etc.

Figure 18:
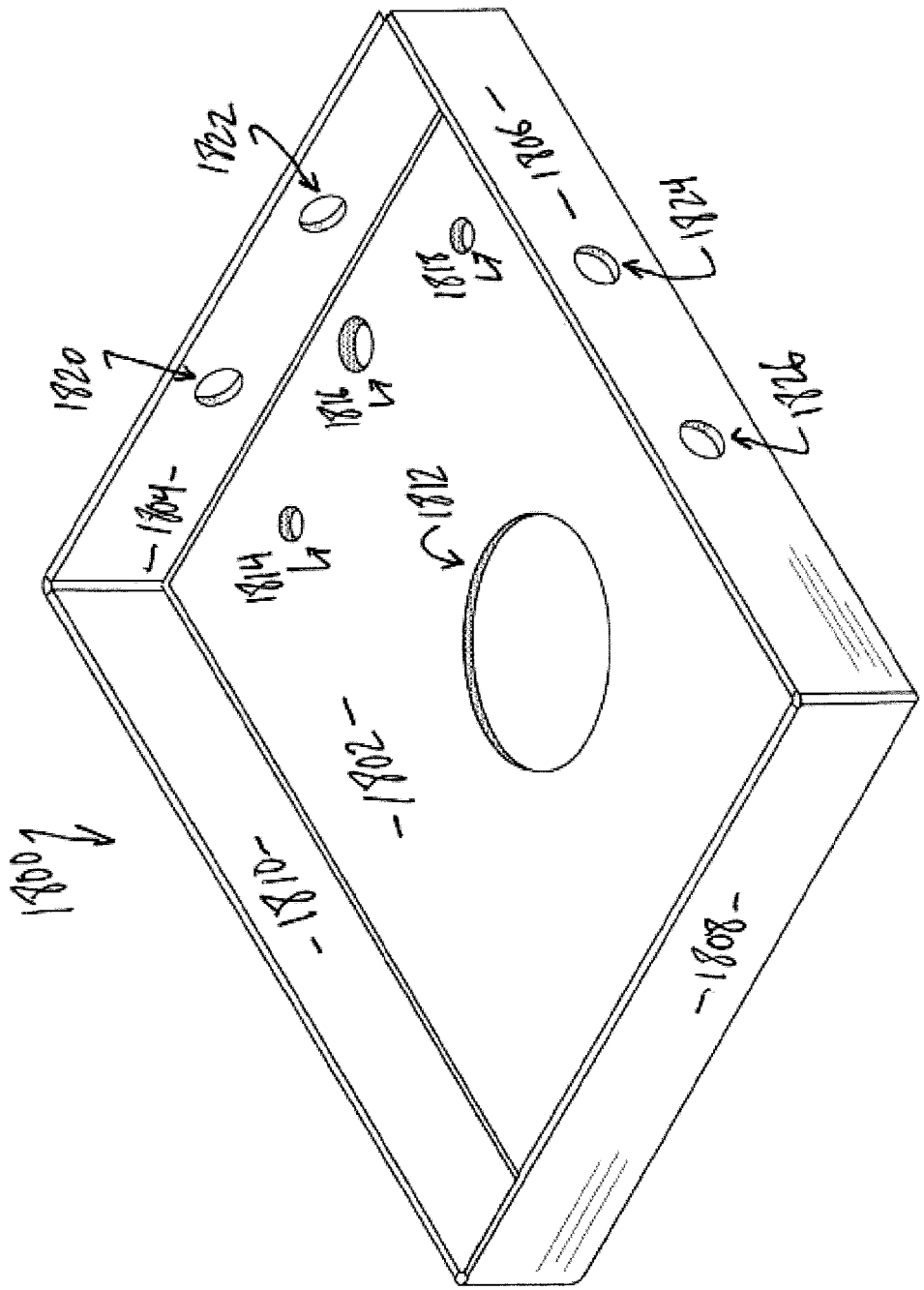
FIG. 18 shows a scanner or printer tray.

FIG. 18 is a top front perspective that shows a scanner or printer tray 1800. Printer tray 1800 includes a bottom 1802 a first side wall 1804, a second side wall 1806, a third side wall 1808 and a fourth sidewall 1810. Printer tray 1800 is generally configured as either a square or rectangle when viewed from the top or bottom perspective, where the size and shape corresponds generally to the size and shape of the article to be supported. Bottom 1802 contains apertures 1812, 1814, 1816, and 1818. Aperture 1812 is useful for cable routing. Apertures 1814, 1816, and 1818 are useful for mounting a clamp assembly (see FIGS. 3 and 4), or mounting to hollow extension arm 130 (see FIGS. 1 and 5), or monitor mounts (see FIG. 15). Apertures 1814, 1816, and 1818 may also be useful for cable routing. First side wall 1804 contains apertures 1820 and 1822 which are useful for mounting a clamp assembly (see FIGS. 3 and 4), or mounting to hollow extension arm 130, (see FIGS. 1 and 5), or monitor mounts (see FIG. 15). Apertures 1820 and 1822 may also be useful for routing cables. Second side wall 1806 contains apertures 1824 and 1826 which are useful for mounting a clamp assembly (see FIGS. 3 and 4), or mounting to hollow extension arm 130 (see FIGS. 1 and 5), or monitor mounts (see FIG. 15). Apertures 1824 and 1826 may also be useful for routing cables.

Figure 19:
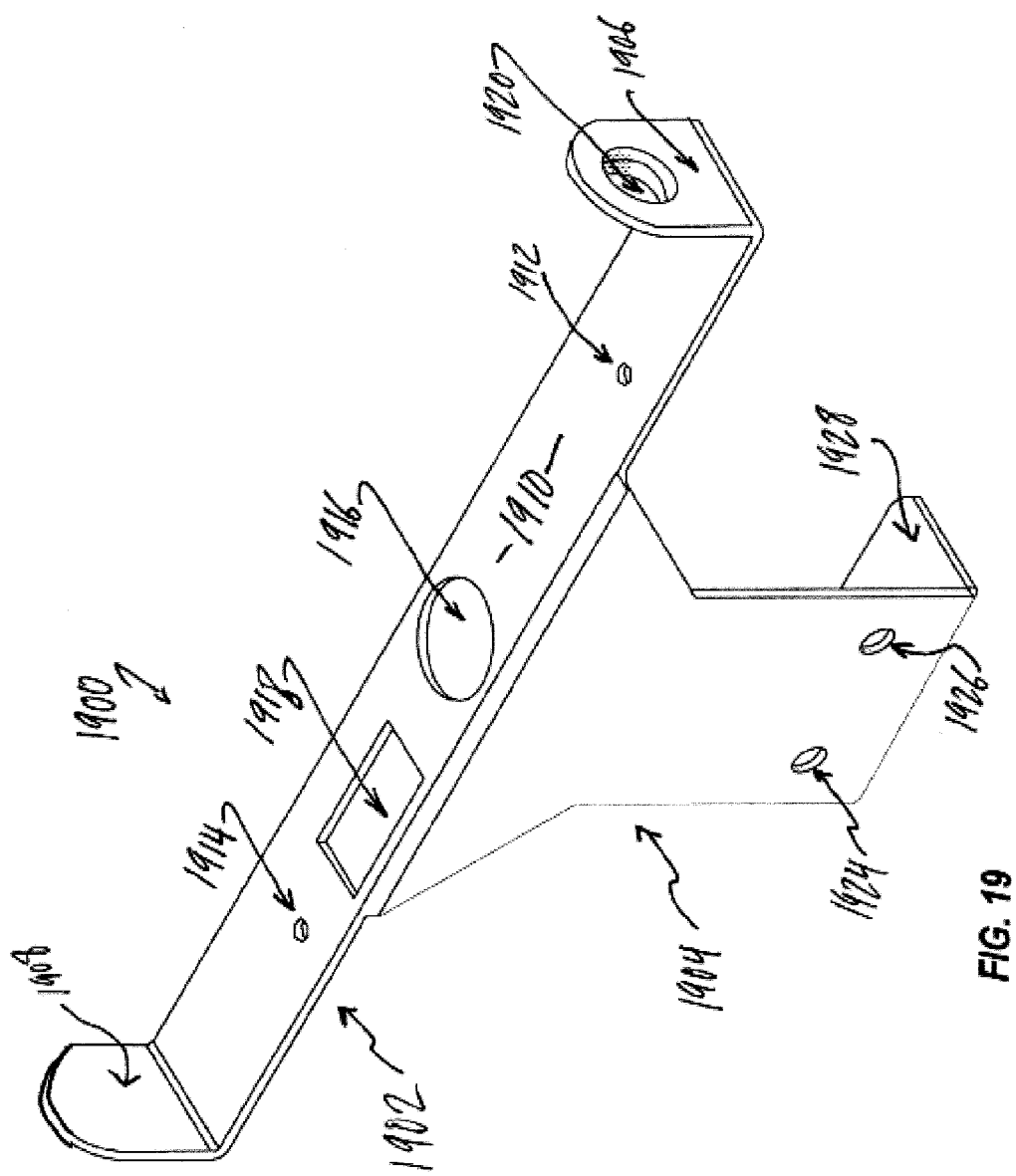
FIG. 19 shows a display mount.

FIG. 19 is a top rear perspective that shows a display mount 1900. Display mount 1900 includes a top member 1902, and a bottom member 1904. Top member 1902 includes a first tab 1906 and a second tab 1908. First tab 1906 and second tab 1908 are generally perpendicular to the plane of a flat member 1910 which connects first tab 1906 and second tab 1908. Flat member 1910 is generally rectangular and flat. Flat member 1910 includes apertures 1912 and 1914 which are useful for mounting a monitor to flat member 1910 via screws, nuts and bolts or other fasteners well known in the art. Flat member 1910 also includes aperture 1916 which is useful for routing cables. Flat member 1910 includes aperture 1918 which is useful for connect bus wires or other types of routing cables. First tab 1906 contains aperture 1920 which is useful for mounting a swivel mount or other connection to a monitor. Second tab 1908 may alternatively contain an aperture 1922, not shown in this embodiment, which is useful for mounting a swivel mount or other connection to a monitor. Flat member 1910 is generally connected to bottom member 1904 perpendicularly with respect to the plane formed by bottom member 1904. Bottom member 1904 contains apertures 1924 and 1926 which are useful for mounting a clamp assembly (see FIGS. 3 and 4), or mounting to hollow extension arm 130 (see FIGS. 1 and 5), or monitor mounts (see FIG. 15). Bottom member 1902 includes a foot 1928 which is generally flat and rectangular and is generally connected to bottom member 1904 perpendicularly with respect to the plane formed by bottom member 1904 such that flat member 1910 and foot 1928 generally lie in planes that are parallel to one another.

Figure 20:
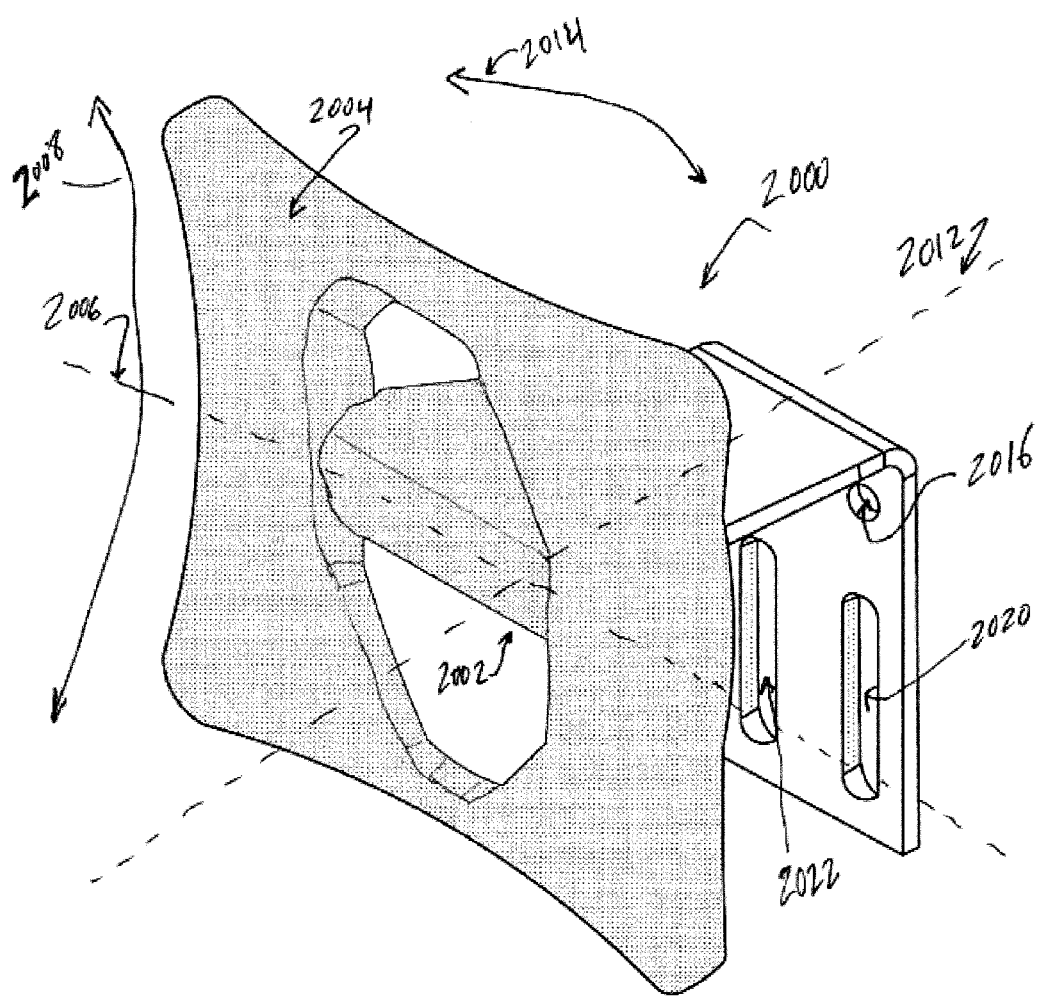
FIG. 20 shows a rack mount equipped with tilt and swivel structure to vary the position of a VESA plate.

FIG. 20 is a top front perspective view of a rack monitor mount 2000 equipped with a tilt and swivel structure 2002 to vary the position of a Video Electronics Standards Association (VESA) plate 2004. The VESA plate 2004 is retained on a tilt arm with an internal bar (not shown) on axis 2006 permitting the VESA plate to tilt up or down as indicated by arrow 2008. Rack monitor mount 2000 contains aperture 2010 (not shown). Aperture 2010 and a bolt described in context of aperture 1514 of FIG. 15 afford side-to-side pivoting on axis 2012 as indicated generally by directional arrow 2014. Rack monitor mount 2000 also contains apertures 2016 and 2018 (not shown) which are useful for mounting a clamp assembly (see FIGS. 3 and 4), or mounting to hollow extension arm 130 (see FIGS. 1 and 5) or monitor mounts (see FIG. 15). Apertures 2016 and 2018 may also be useful for routing cables. Rack monitor mount allows positioning along the length of a rack attached to vertically elongate hollow pole 102. Rack monitor mount 2000 also contains apertures 2020 and 2022 which are useful for mounting a monitor to a rack which is attached by various clamp assemblies, such as in FIGS. 3 and 4, to vertically elongate hollow pole 102 or to hollow extension arm 130.

Figure 21:
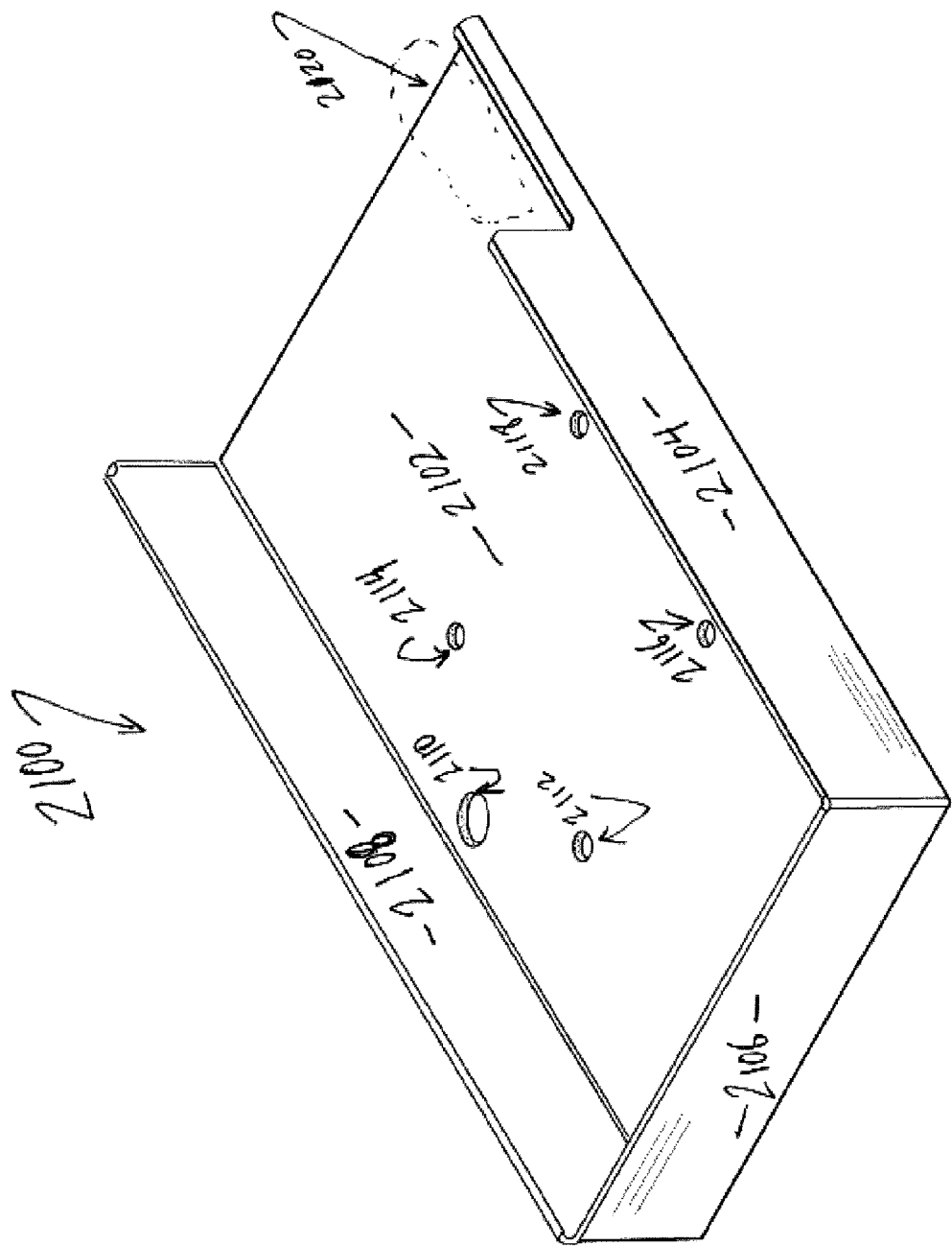
FIG. 21 shows a tray for holding a printer.

FIG. 21 is a top front perspective view that shows a tray 2100 for holding a printer. Tray 2100 includes a bottom 2102, a first side wall 2104, a second side wall 2106, and a third side wall 2108. Tray 2100 is generally configured as either a square or rectangle when viewed from the top or bottom perspective. Bottom 2102 contains apertures 2110, 2112, 2114, 2116, and 2118. Apertures 2110, 2112, 2114, 2116 and 2118 are useful for mounting a clamp assembly (see FIGS. 3 and 4), or mounting to hollow extension arm 130 (see FIGS. 1 and 5), or monitor mounts (see FIG. 15). Aperture 2110, 2112, 2114, 2116 and 2118 may also be useful for routing cables. First side wall 2104 has a rearward rectangular portion that is cut-out and creates an access 2120. Access 2120 is useful for imparting increased access to the printer.

Figure 22:
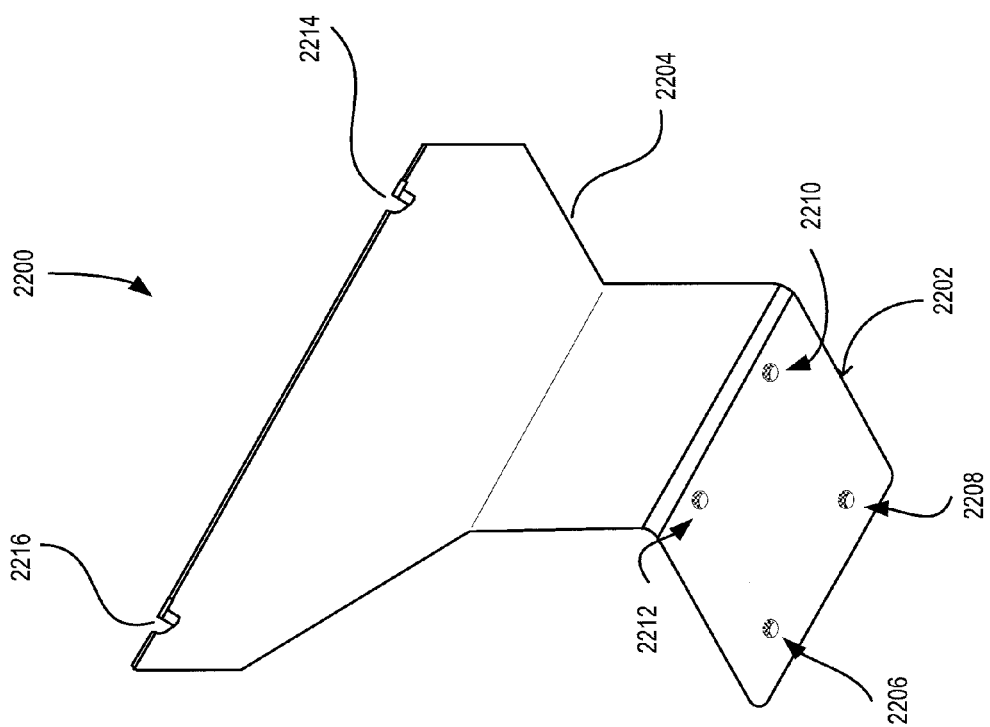
FIG. 22 shows a telephone mount pad.

FIG. 22 is a top front perspective view that shows a telephone mount pad 2200. Telephone mount pad 2200 includes a mounting platform 2202 and a telephone pad portion 2204. Mounting platform 2202 is generally rectangular and flat. Mounting platform 2202 contains apertures 2206, 2208, 2210, and 2212. Apertures 2206, 2208, 2210, and 2212 are useful for mounting a clamp assembly (see FIGS. 3 and 4) or mounting to hollow extension arm 130 (see FIGS. 1 and 5), or monitor mounts (see FIG. 15), or directly to vertically elongate hollow pole 102 via screws, nuts and bolts or other fasteners well known in the art. Telephone pad portion 2204 is depicted as a rectangular shape with a dovetail platform in the embodiment of telephone mount pad 2200 depicted in FIG. 22, however telephone pad portion 2204 may be of any shape consistent with placing a telephone upon it. In one embodiment, telephone pad portion 2204 includes containment tabs 2214 and 2216. Containment tabs 2214 and 2216 are useful for maintaining the position of a telephone lying upon telephone pad portion 2204. Mounting platform 2202 and telephone pad portion 2204 are generally oriented perpendicularly with respect to one another as depicted in the embodiment of telephone mount pad 2200 in FIG. 22.

Figure 23:
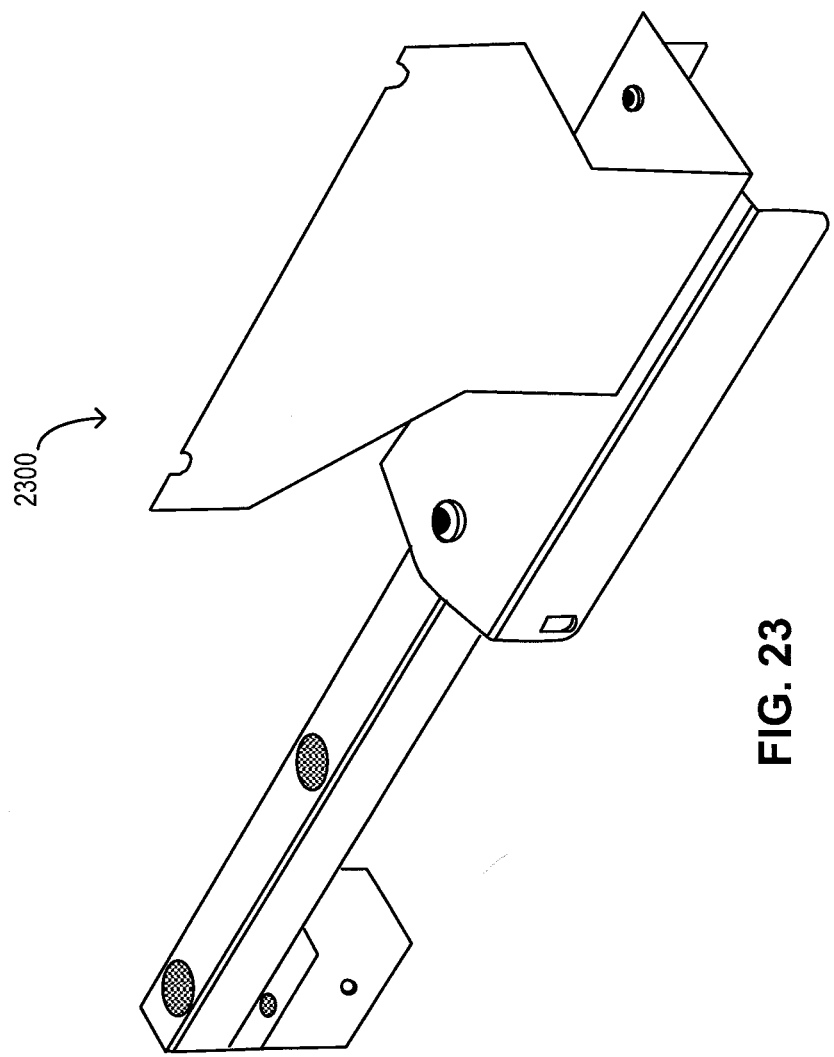
FIG. 23 shows the telephone mount pad of FIG. 29 residing on an extension arm of FIG. 5.

FIG. 23 is a top front perspective view of a phone mount on extension arm 2300 which is comprised of the telephone mount pad of FIG. 22 mounted upon on an extension arm for horizontal mounting purposes of FIG. 17 which is mounted upon a hollow extension arm 130 of FIG. 5.

Figure 24:
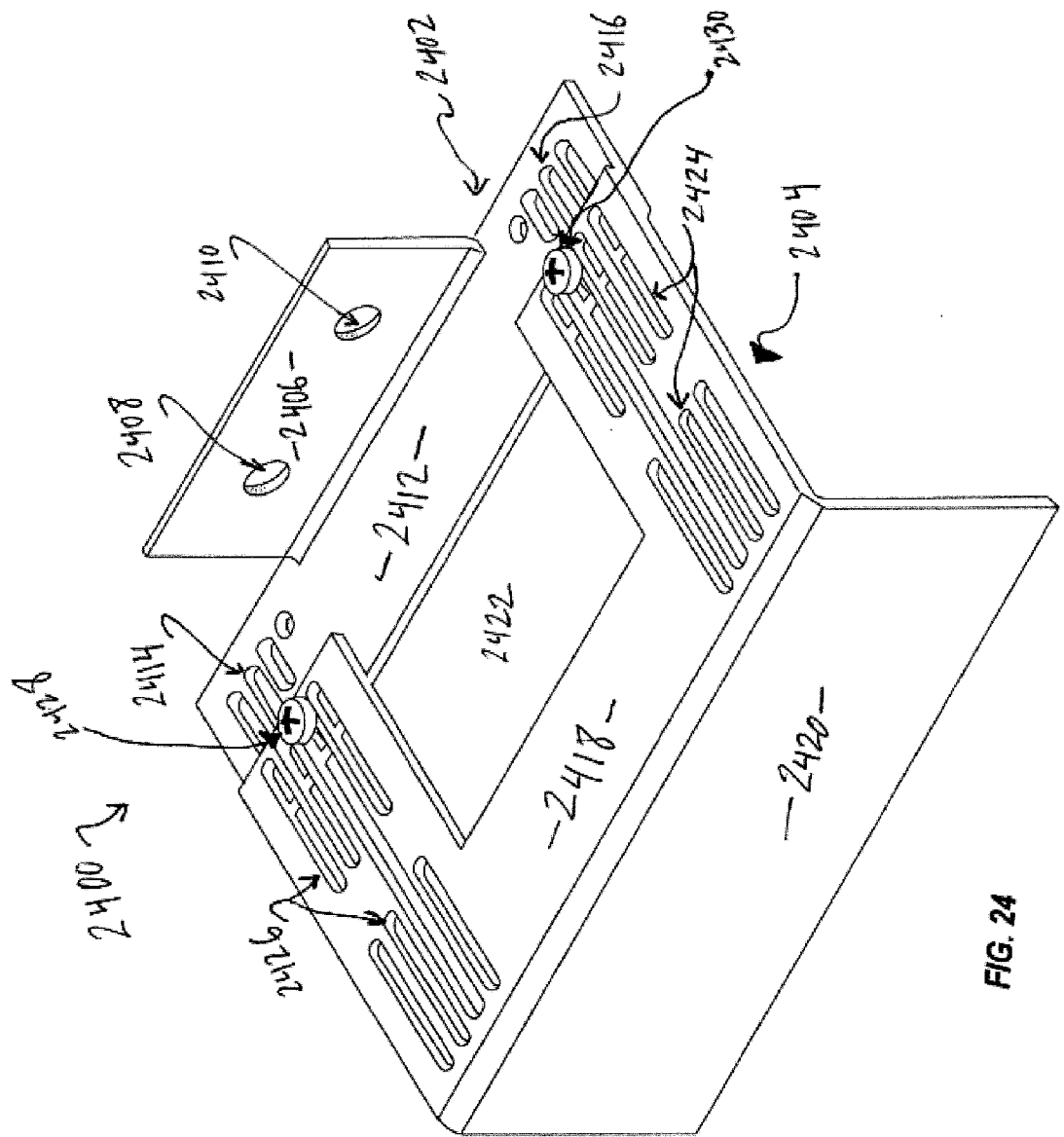
FIG. 24 shows a personal computer and/or power brick attachment bracket.

FIG. 24 is a bottom rearward perspective view that depicts a personal computer and/or power brick attachment bracket 2400. Personal computer and/or power brick attachment bracket 2400 includes mounting bracket 2402 and platform bracket 2404. Mounting bracket 2402 includes mounting lip 2406 which included apertures 2408 and 2410. Apertures 2408, and 2410 are useful for mounting a clamp assembly (see FIGS. 3 and 4) or mounting to hollow extension arm 130 (see FIGS. 1 and 5) or directly to vertically elongate hollow pole 102 (see FIG. 1) via screws, nuts and bolts or other fasteners well known in the art. Mounting bracket 2402 also includes connector platform 2412 which contains mounting aperture groupings 2414 and 2416. Mounting lip 2406 and connector platform 2412 are generally connected to one another perpendicularly along a side of mounting lip 2406. Mounting aperture groupings 2414 and 2416 comprise various numbers of apertures useful for mounting platform bracket 2404 to mounting bracket 2402 via screws, nuts and bolts or other fasteners well known in the art. In the embodiment of personal computer and/or power brick attachment bracket 2400 depicted in FIG. 24 mounting aperture groupings 2414 and 2416 are depicted as elongate apertures oriented in parallel tracks relative to one another and are useful for adjusting the overall width or length of personal computer and/or power brick attachment bracket 2400 by fixing the position of mounting bracket 2402 and platform bracket 2404 through screws, nuts and bolts or other fasteners well known in the art at various positions along aperture groupings 2414 and 2416. Platform bracket 2404 includes connector platform 2418 and containment lip 2420. Connector platform 2418 and containment lip 2420 are oriented towards one another perpendicularly. Connector platform 2418 is generally planar and C-shaped and has an opening 2422 which is useful for routing cables. Connector platform 2418 also includes aperture groupings 2424 and 2426 which are useful for mounting a personal computer and/or power brick and/or for connecting to mounting bracket 2402 via screws, nuts and bolts or other fasteners well known in the art. Containment lip 2420 is useful for maintaining the position of a personal computer and/or power brick positioned upon connector platform 2418 and/or the substantially planar surface created by the fixing of connector platform 2418 to connector platform 2412 via screws 2428 and 2430 or by nuts and bolts or other fasteners well known in the art.

Figure 25:
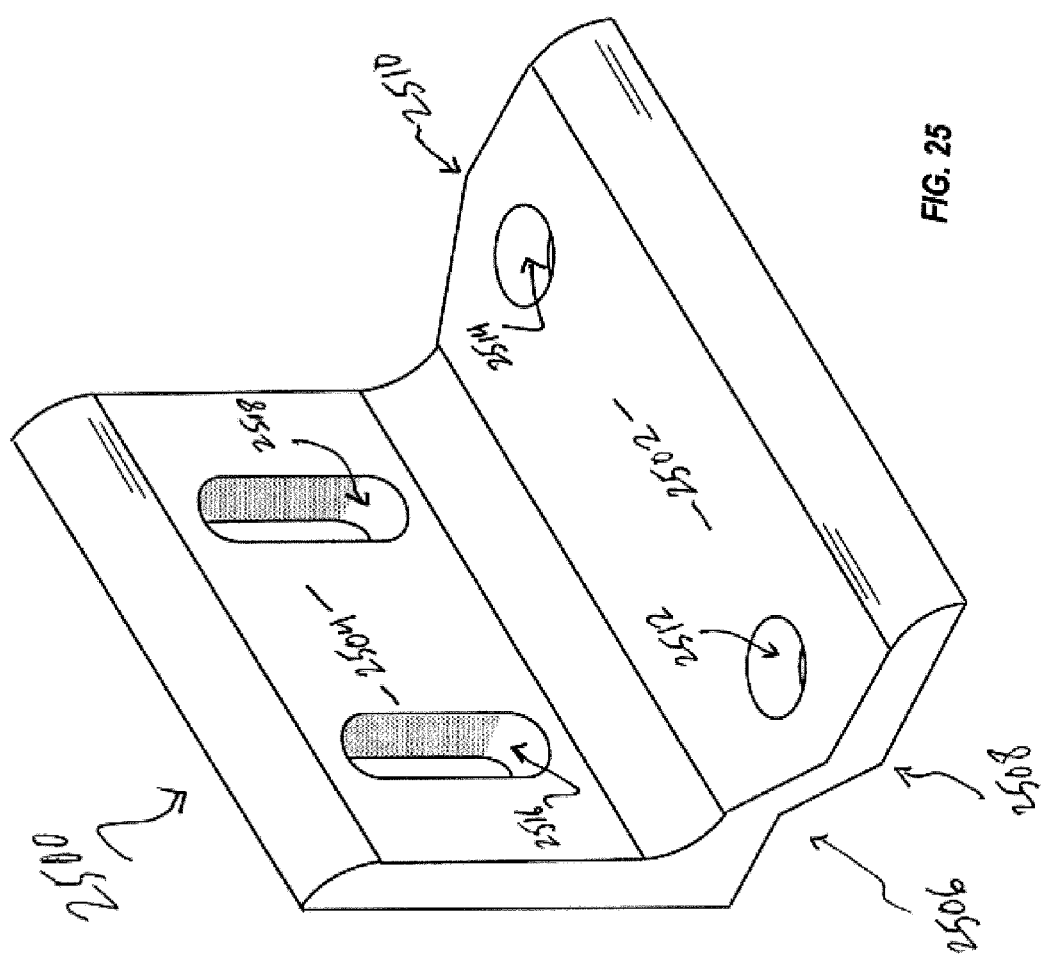
FIG. 25 shows a custom mounting foot that may be used to support the vertically elongate pole.

FIG. 25 is a top front perspective view that depicts a custom mounting foot 2500 that may be used to support the vertically elongate pole 103 (see FIG. 1). Custom mounting foot 2500 is generally configured and numbered according to 118, 120, 124 and 126 of FIG. 1 as well as the numbering of FIG. 2 and is useful for mounting vertically elongate hollow pole 102 to a floor, ceiling, countertop or other surface such as depicted in 102, 118 and 122 of FIG. 1. Custom mounting foot 2500 is generally depicted as an L-shaped bracket with two mounting surfaces, a first mounting surface 2502 and a second mounting surface 2504. The shapes of custom mounting foot 2500 may be configured to have varying configurations of the shapes of first mounting surface 2502 and a second mounting surface 2504 but are generally planar and generally rectangular. First mounting surface 2502 and a second mounting surface 2504 are generally perpendicularly oriented to one another. In the embodiment of custom mounting foot 2500 depicted in FIG. 25, first mounting surface 2502 is connected to second mounting surface 2504 through an extended connector joint 2506 and also contains design flares 2508 and 2510. First mounting surface 2502 contains apertures 2512 and 2514 which are useful for mounting directly to vertically elongate hollow pole 102 (see FIG. 1), via screws, nuts and bolts or other fasteners well known in the art. Second mounting surface 2504 contains apertures 2516 and 2518 which are useful for mounting to a floor, ceiling, countertop or other surface via screws, nuts and bolts or other fasteners well known in the art.

Figure 26:
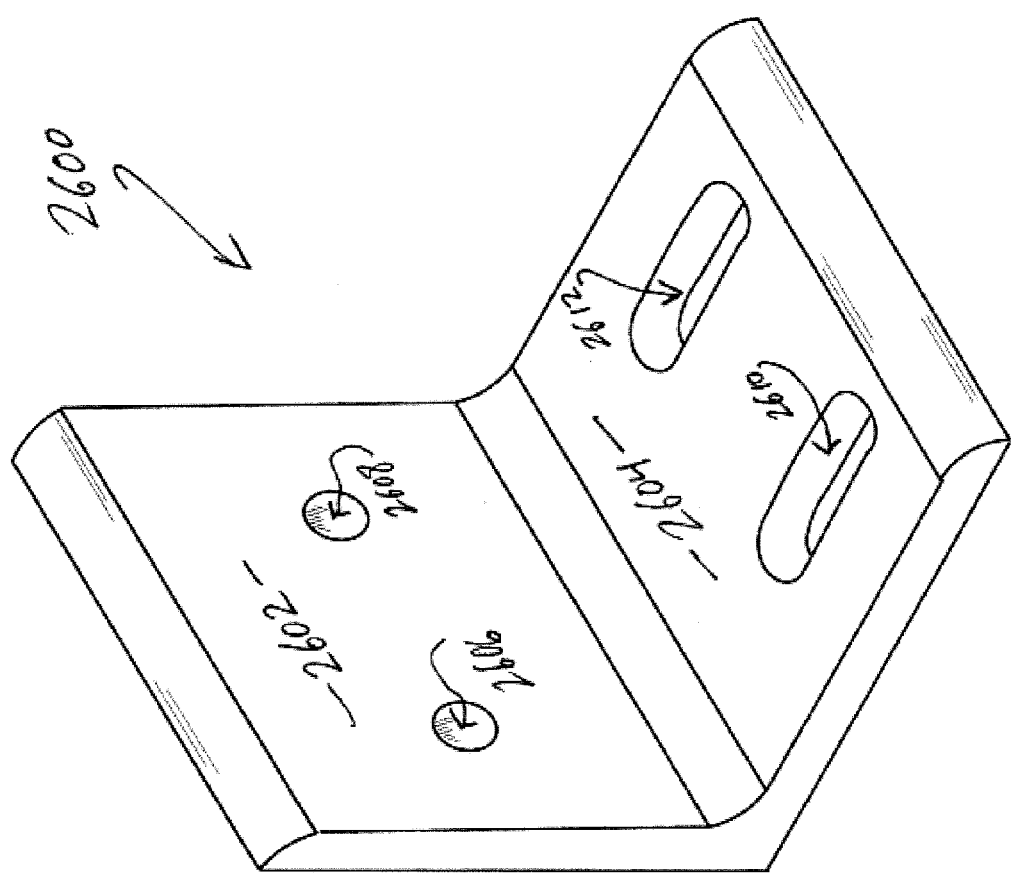
FIG. 26 shows a standard mounting foot.

FIG. 26 is a top front perspective view that depicts a standard mounting foot 2600 that may be used to support the vertically elongate pole 103 (see FIG. 1). Standard mounting foot 2600 is generally configured and numbered according to 118, 120, 124 and 126 of FIG. 1 as well as the numbering of FIG. 2 and is useful for mounting vertically elongate hollow pole 102 to a floor, ceiling, countertop or other surface such as depicted in 102, 118 and 122 of FIG. 1. Standard mounting foot 2600 is generally depicted as an L-shaped bracket with two mounting surfaces, a first mounting surface 2602 and a second mounting surface 2604. The shapes of first mounting surface 2602 and second mounting surface 2604 are generally planar and rectangular. First mounting surface 2602 and a second mounting surface 2604 are generally perpendicularly oriented to one another. First mounting surface 2602 contains apertures 2606 and 2608 which are useful for mounting directly to vertically elongate hollow pole 102 (see FIG. 1) via screws, nuts and bolts or other fasteners well known in the art. Second mounting surface 2604 contains apertures 2610 and 2612 which are useful for mounting to a floor, ceiling, countertop or other surface via screws, nuts and bolts or other fasteners well known in the art.

Figure 27:
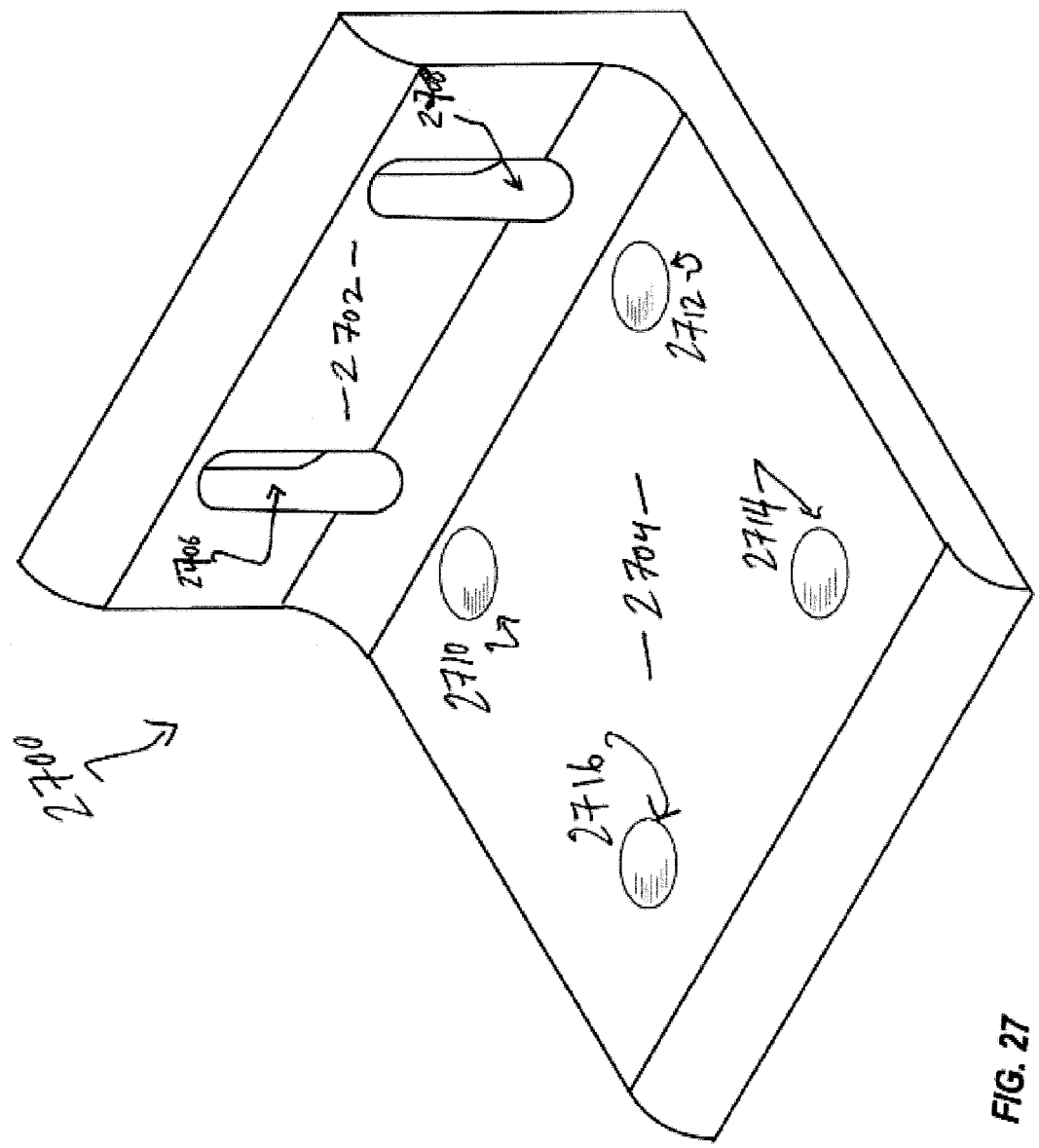
FIG. 27 shows a mounting foot that may be used to mount the extension arm of FIG. 5.

FIG. 27 is a top front perspective view that depicts a mounting foot 2700. Mounting foot 2700 is useful for mounting extension arm 130 as depicted in FIG. 1 and FIG. 5 to a floor, ceiling, countertop or other surface. Mounting foot 2700 is generally depicted as an elongate L-shaped bracket with two mounting surfaces, a first mounting surface 2702 and a second mounting surface 2704. The shapes of first mounting surface 2702 and second mounting surface 2704 are generally planar and square or rectangular shaped. First mounting surface 2702 and a second mounting surface 2704 are generally perpendicularly oriented to one another. First mounting surface 2702 contains apertures 2706 and 2708 which are useful for mounting to a floor, ceiling, countertop or other surface via screws, nuts and bolts or other fasteners well known in the art. Second mounting surface 2704 contains apertures 2710, 2712, 2714 and 2716 which are useful for mounting to extension arm 130 as depicted in FIG. 1 and FIG. 5 through holes 500, 502 that may receive bolts with flat nuts, such as bolt 304 and flat nut 308 shown in FIG. 4 or via screws, nuts and bolts or other fasteners well known in the art.

Figure 28:
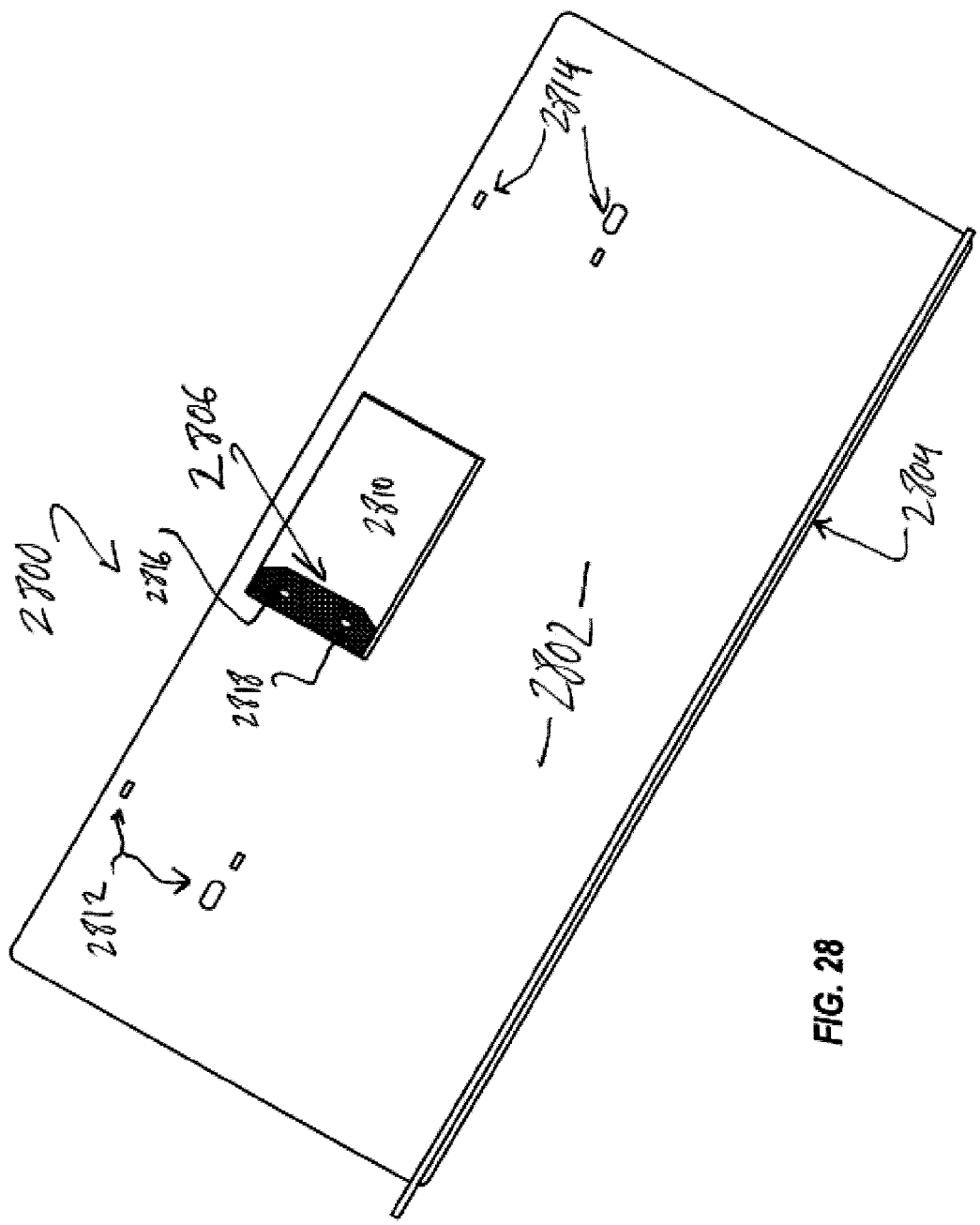
FIG. 28 shows a keyboard tray.

FIG. 28 is a top front perspective view that shows a keyboard tray 2800. Keyboard tray 2800 includes a bottom platform 2802, a containment lip 2804, mounting tabs 2806 and 2808 (not pictured), an access port 2810, keyboard fixing aperture groupings 2812 and 2814. Bottom platform 2802 is generally rectangular shaped and planar such that a keyboard may be supported upon it. Bottom platform 2802 contains access port 2810 which is generally rectangular shaped and useful for routing cables. Bottom platform 2802 is connected to containment lip 2804 along the length of bottom platform 2802 and containment lip 2804. Bottom platform 2802 and containment lip 2804 are substantially perpendicularly oriented with respect to one another. Containment lip 2804 is useful for maintaining the position of a keyboard placed upon bottom platform 2802. Mounting tabs 2806 and 2808 are attached to bottom platform at opposite openings in access port 2010. Mounting tab 2806 contains apertures 2816 and 2818. Mounting tab 2808 contains apertures 2820 and 2822 (not pictured). Mounting apertures 2816, 2818, 2820 and 2822 are useful for mounting to extension arm 1700 as depicted in FIG. 17 but are also useful for connecting to various mounts and other extension arms described herein via screws, nuts and bolts or other fasteners well known in the art. Bottom platform 2802 also contains mounting tab groupings 2812 and 2814. Mounting tab groupings 2812 and 2814 are useful for maintaining the position of a keyboard that is lying upon bottom platform 2802 through receiving tabs projecting from a keyboard through their apertures but may also fix the position of a keyboard to bottom platform 2802 through other fixing means well known in the art.

Figure 29:
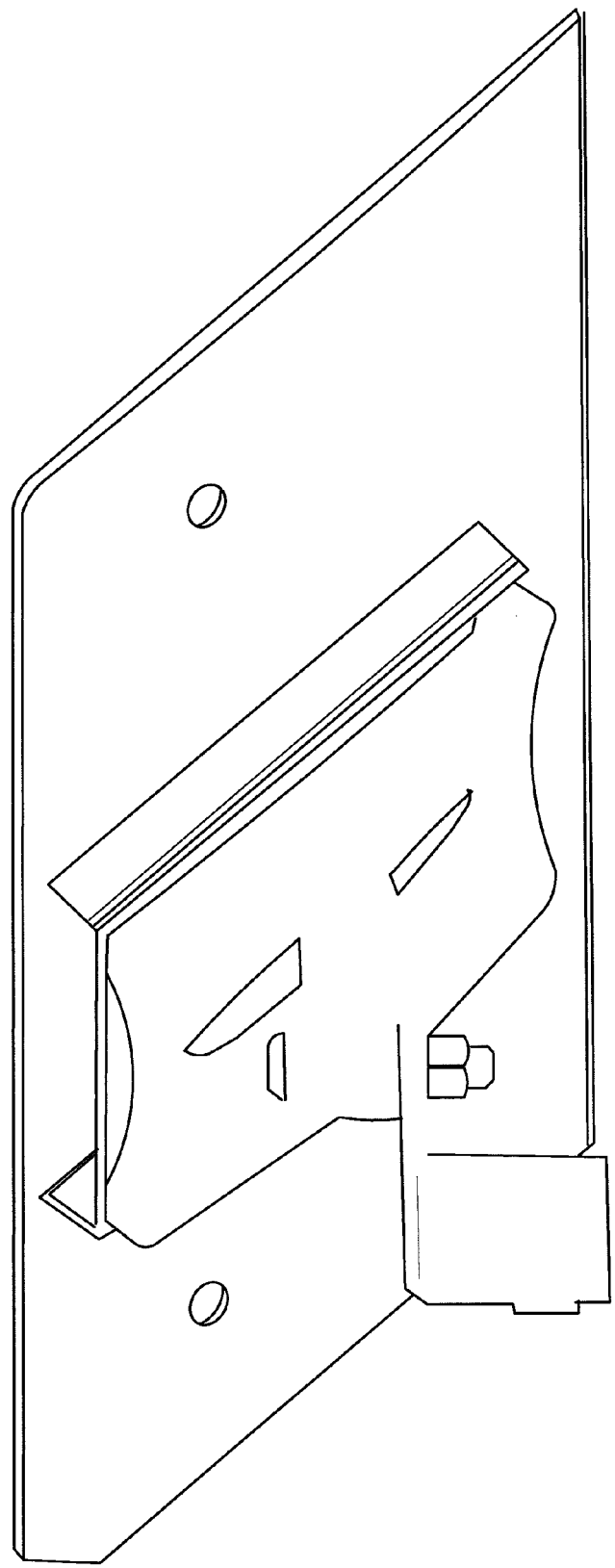
FIG. 29 shows a keyboard tray equipped with a tilt and swivel mechanism.

FIG. 29 is a bottom rear perspective view that depicts a swivel mount keyboard tray 2900 comprising the keyboard tray of FIG. 28 attached a tilt and swivel mechanism having generally the same function as those depicted in FIGS. 16 and 20 that is attached to a mounting bracket similar to that depicted in FIG. 14.

Figure 30:
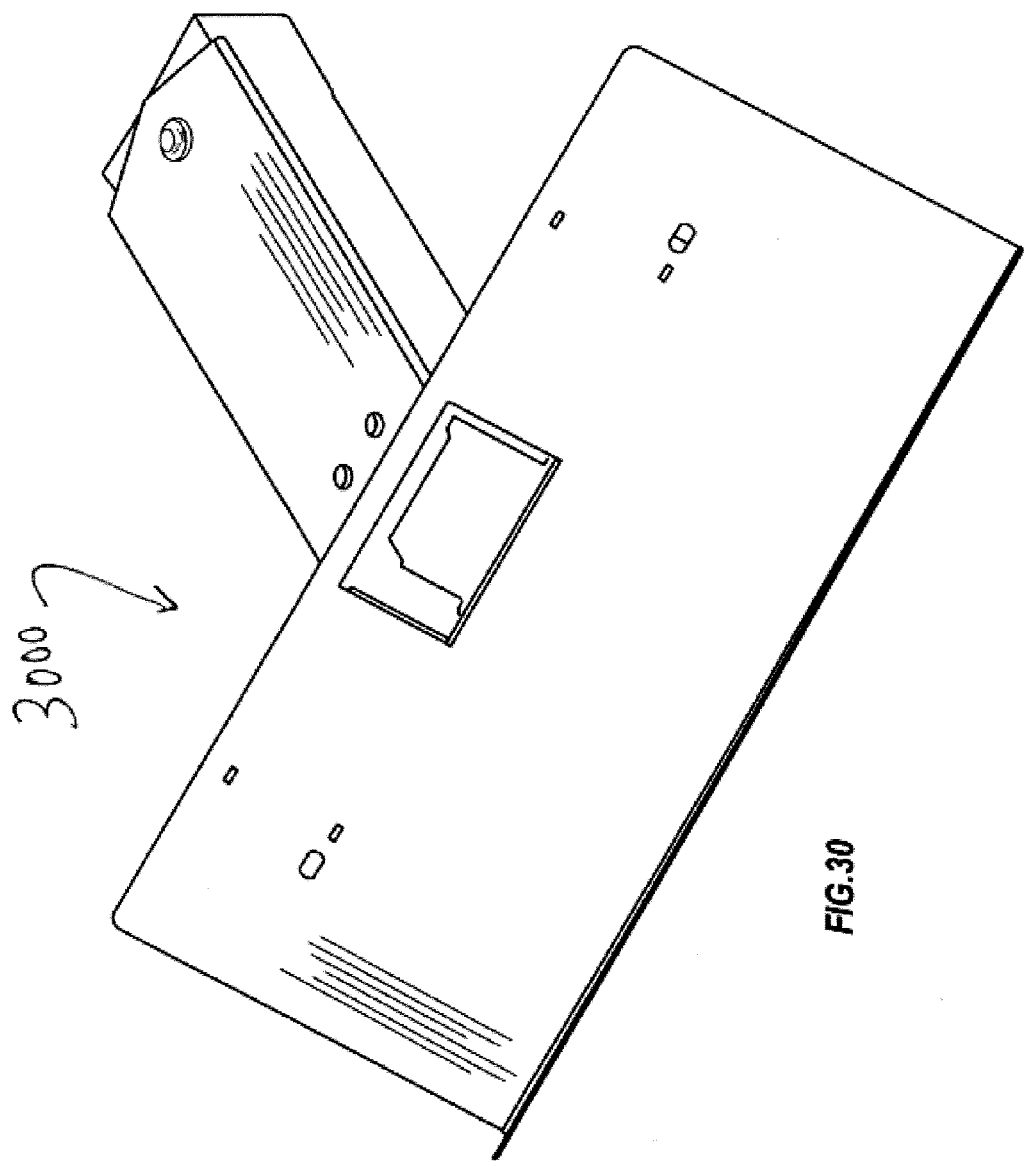
FIG. 30 shows a keyboard tray equipped with an extension arm.

FIG. 30 is a front top perspective view that depicts an extension arm mount keyboard tray 3000 comprising the keyboard tray of FIG. 28 attached to the extension arm of FIG. 17 which may be attached variously to hollow extension arm 130 of FIG. 5 and FIG. 1 or to the clamp assemblies of FIGS. 3 and 4, for example.

The foregoing embodiments teach by way of example and not by limitation. Those skilled in the art will appreciate that insubstantial changes may be made to what is shown and described without departing from the scope and spirit of the invention. Accordingly, the inventors hereby state their intention to rely upon the Doctrine of Equivalents, if needed, in protecting their rights in the invention.

We claim:

1. A selectively adjustable equipment mounting structure comprising:
    a hollow vertically elongate pole having a rectilinear cross-section and a face with two parallel-track channels formed therein, the parallel-track channels being in parallel to one another and running in parallel also with an axis of elongation in the elongate pole,
    each of the parallel-track channels having a bight connecting a pair of opposed wings to define an inward space,
    each wing having a ridge extending inwardly over the inward space towards the other wing;
    means for mounting the elongate pole to a support structure;
    an equipment carrier including at least one equipment mounting platform selected from the group consisting of:
    (1) a pivotally adjustable keyboard mount,
    (2) a pivotally adjustable display mount, and
    (3) an arm with means for mounting electronic equipment on the arm and means for containing cables connected to the electronic equipment; and
    means for mounting the equipment carrier to each of the parallel track channels, wherein the means for mounting consists essentially of
        a single mounting block assembly adapted to position the equipment carrier at a selectively adjustable position by binding interaction with each of the parallel-track channels, and wherein the at least one equipment mounting platform is coupled with the mounting block assembly,
        a plurality of bolts attaching the equipment carrier to the mounting block assembly,
        the mounting block assembly having a plurality of openings adapted to receive the bolts in parallel with the parallel-track channels.

2. The equipment mounting structure of claim 1, wherein the mounting block assembly includes a block presenting a two through apertures, each aperture being provided with a bolt passing through the aperture and a channel nut threaded onto the bolt to provide the binding interaction with a corresponding one of the parallel-track channels.

3. The equipment mounting structure of claim 1, wherein the hollow vertically elongate pole has a square cross-section perpendicular to the perpendicular-track channels.

4. The equipment mounting structure of claim 3, wherein the hollow vertically elongate pole presents four faces along sides of the square cross section, and each face has a pair of parallel-track channels formed therein.

5. A method of mounting equipment using the equipment mounting structure of claim 1, comprising:

loosening the mounting block assembly to achieve non-binding interaction from a position on the parallel-track channels where the mounting block assembly resides;

sliding the mounting block assembly in the parallel track channels to reach a new position on the parallel track channels; and tightening the mounting block assembly to reside at the new position.

\* \* \* \* \*